US006404155B1

(12) United States Patent
Funayama et al.

(10) Patent No.: US 6,404,155 B1
(45) Date of Patent: Jun. 11, 2002

(54) DC MOTOR DRIVE CIRCUIT

(75) Inventors: Hideo Funayama; Hiromitsu Sato, both of Ohtawara (JP)

(73) Assignee: Taiko Device, Ltd., Ohtawara (JP)

( * ) Notice: Subject to any disclaimer, the term of this patent is extended or adjusted under 35 U.S.C. 154(b) by 0 days.

(21) Appl. No.: 09/694,986

(22) Filed: Oct. 25, 2000

(51) Int. Cl.[7] ................................ B60S 1/08; B60J 1/08

(52) U.S. Cl. ....................... 318/293; 318/286; 318/375; 318/443

(58) Field of Search ................................ 318/293, 375, 318/379, 244, 245, 280, 286, 443, 466, 468

(56) References Cited

U.S. PATENT DOCUMENTS 3,688,173 A * 8/1972 Ballou
4,282,445 A * 8/1981 Ditzer .................... 318/443 X
4,450,390 A * 5/1984 Andrei-Alexandru et al. ... 318/468 X
4,621,223 A * 11/1986 Murakami et al. .......... 318/282
4,689,535 A * 8/1987 Tsunoda et al. ............ 318/443
5,184,050 A * 2/1993 Harada et al. .............. 318/467
5,786,676 A * 7/1998 Ogawa et al. .............. 318/468
5,790,355 A * 8/1998 Ishmael ....................... 361/27
5,801,502 A * 9/1998 Monzen ...................... 318/286

FOREIGN PATENT DOCUMENTS

JP Util 46-11499 4/1971

* cited by examiner

*Primary Examiner*—Bentsu Ro
(74) *Attorney, Agent, or Firm*—Oliff& Berridge, PLC

(57) ABSTRACT

When an electromagnetic relay connects a movable contact to a normally open contact N/O, direct current flows through direct current motor and thereby the direct current motor is driven. When the electromagnetic relay connects the movable contact to a normally closed contact N/C, the rotation of the direct current motor is braked. A plurality of normally open contacts N/O are connected in series in the passage of direct current obtained when the electromagnetic relay connects the movable contact to the normally open contact N/O.

14 Claims, 16 Drawing Sheets

DC MOTOR DRIVE CIRCUIT

BACKGROUND OF THE INVENTION

1. Field of the Invention

The present invention relates to a DC (direct current) motor drive circuit for use in a windshield wiper drive section or a power window drive section of automobiles, for example.

2. Description of the Prior Art

Heretofore, DC motor drive circuits using an electromagnetic relay have often been used in order to activate and control a windshield wiper drive section and a drive section for driving a power window mechanism to move a power window of automobile upward or downward FIG. 1 of the accompanying drawings is a schematic circuit diagram showing an example of a prior-art DC motor drive circuit for use in a windshield wiper drive section. FIG. 2 is a schematic circuit diagram showing an example of a prior-art DC motor drive circuit for use in a drive section of a power window drive mechanism to move a power window upward or downward.

First, an example of a DC motor drive circuit for use in a windshield wiper drive section will be described with reference to FIG. 1. As shown in FIG. 1, one end of a windshield wiper driving DC motor 1 is connected to a terminal 2*a* connected to a movable contact (this movable contact is usually connected to a suitable means such as a contact spring driven by an armature) AR of an electromagnetic relay 2. The above terminal 2*a* connected to the movable contact AR will hereinafter be referred to as "movable contact terminal".

The other end of the DC motor 1 is connected to a terminal 2*b* connected to a normally closed contact N/C (i.e. break contact) of the electromagnetic relay 2. The above terminal 2*b* connected to the normally closed contact N/C will hereinafter be referred to as "normally closed contact terminal". A connection point 2*d* between the other end of the DC motor 1 and the normally closed contact 2*b* is connected to the ground.

A terminal 2*m* connected to a normally open contact N/O (i.e. make contact) of the electromagnetic relay 2 is connected to a power supply at a terminal 3, at which a positive DC voltage (+B) is connected from a car battery (not shown). The above terminal 2*m* to which the normally open contact N/O is connected will hereinafter be referred to as "normally open contact terminal".

The electromagnetic relay 2 includes a coil 2C to which a controlling current responsive to user's operation is supplied from a windshield wiper drive controller 4 when the user operates a windshield wiper switch 5. The windshield wiper switch 5 includes three switching positions of "OFF position", "INTERMITTENT position" and "CONTINUOUS position". Fixed contacts 5*a*, 5*b*, 5*c* at these switching positions are connected to the windshield wiper drive controller 4.

When the windshield wiper switch 5 connects its movable contact 5*m* to the fixed contact 5*a* (OFF position), the coil 2C is not energized by the controlling current from the windshield wiper drive controller 4 so that the electromagnetic relay 2 connects the movable contact AR to the normally closed contact N/C. As a result, one end and the other end of the DC motor 1 are connected to each other and thereby the DC motor 1 can be braked (or placed in the stationary state).

When the windshield wiper switch 5 connects the movable contact 5*m* to the fixed contact 5*b* (INTERMITTENT position), the coil 2C of the electromagnetic relay 2 is intermittently energized by the controlling current from the windshield wiper drive controller 4. As a result, the electromagnetic relay 2 connects the movable contact AR to the normally open contact N/O during the coil 2C is being energized by the controlling current. When the coil 2C is not energized by the controlling current, the electromagnetic relay 2 connects the movable contact AR to the normally closed contact N/C side. Specifically, the electromagnetic relay 2 alternately connects the movable contact AR to the normally closed contact N/C and the normally open contact N/O each time the coil 2C is energized or is not energized by the controlling current.

When the electromagnetic relay 2 connects the movable contact AR to the normally open contact N/O, direct current flows through the DC motor 1 as shown by a solid-line arrow I in FIG. 1 and thereby the DC motor 1 can be driven. When the electromagnetic relay 2 connects the movable contact AR to the normally closed contact N/C, the DC motor 1 can be braked. In other words, the DC motor 1 may be driven intermittently. As this DC motor 1 is driven intermittently, the windshield wiper is driven intermittently.

When the windshield wiper switch 5 connects the movable contact 5*m* to the fixed contact 5*c* (CONTINUOUS position), the windshield wiper drive controller 4 continuously supplies a controlling current to the coil 2C of the electromagnetic relay 2. As a result, the electromagnetic relay 2 connects the movable contact AR to the normally open contact N/O to permit the DC current to flow through the DC motor 1 continuously as shown by the solid-line arrow I in FIG. 1. Thus, the windshield wiper can be driven continuously.

When the windshield wiper switch 5 connects the movable contact 5*m* to the fixed contact 5*a* (OFF position), the coil 2C of the electromagnetic relay 2 is not energized so that the electromagnetic relay 2 is released to connect the movable contact AR to the normally closed contact N/C.

Next, an example of a conventional DC motor drive circuit for use in a power window drive section will be described with reference to FIG. 2.

As shown in FIG. 2, one end of a power window DC motor 11 is connected to a movable contact terminal 12*a* of an electromagnetic relay 12 that is used to move a power window upward. The other end of the DC motor 11 is connected to a movable contact terminal 13*a* of an electromagnetic relay 13 that is used to move a power window downward.

A normally closed contact terminal 12*b* of the electromagnetic relay 12 and a normally closed contact terminal 13*b* of the electromagnetic relay 13 are connected to each other. A connection point 12*d* between the normally closed contact terminal 12*b* and the normally closed contact terminal 13*b* is connected to the ground. A normally open contact terminal 12*m* of the electromagnetic relay 12 and a normally open contact terminal 13*m* of the electromagnetic relay 13 are connected to each other. A connection point 12*e* between the normally open contact terminal 12*m* and the normally open contact terminal 13*m* is connected to the power supply at the terminal 3, at which a positive DC voltage (+B) is connected from a car battery (not shown), for example.

A power window ascending controller 14 supplies controlling current to the coil 12C of the electromagnetic relay 12 each time the user operates a power window drive section to move the power window upward. A power window descending controller 16 supplies controlling current to the coil 13C of the electromagnetic relay 13 each time the user operates the power window drive section to move the power window downward.

While the user is operating the power window drive section to move the power window upward, a power window switch 15 is being energized and the power window ascending controller 14 supplies controlling current to the coil 12C of the electromagnetic relay 12 to energize the coil 12*c* to allow the electromagnetic relay 12 connect the movable contact AR to the normally closed contact N/O. Accordingly, direct current flows through the DC motor 11 in the direction shown by a solid-line arrow in FIG. 2 so that the DC motor 11 is driven in the positive direction, for example, to move the power window upward, i.e. in the direction in which the power window closes.

When the user stops operating the power window drive section to move the power window upward, a power window switch 15 is de-energized to stop the supply of the controlling current to the coil 12C of the electromagnetic relay 12 to allow the electromagnetic relay 12 to connect the movable contact AR to the normally closed contact N/C. Therefore, the DC motor 11 is braked to stop the upward movement of the power window.

While the user is operating the power window drive section to move the power window downward, a power window switch 17 is being energized and the power window descending controller 16 supplies the controlling current to the coil 13C of the electromagnetic relay 13 to energize the coil 13C to allow the electromagnetic relay 13 to connect the movable contact AR to the normally open contact N/O. Accordingly, direct current flows through the DC motor 11 in the direction shown by a dashed-line arrow 12 in FIG. 2 so that the DC motor 11 is driven in the direction opposite to the direction in which it is driven when the power window is moved upward thereby to move the power window downward.

When the user stops operating the power window drive section to move the power window downward, the switch 17 is de-energized so that the coil 13C of the electromagnetic relay 13 is not energized by the controlling current, permitting the electromagnetic relay 13 to connect the movable contact AR to the normally closed contact N/C side. Thus, the DC motor 11 can be braked and thereby the downward movement of the power window can be stopped.

In this manner, the conventional DC motor drive circuit uses one contact group of the electromagnetic relay and energizes the coil of the electromagnetic relay to connect the movable contact AR to the normally open contact N/O thereby to drive the DC motor. On the other hand, the conventional DC motor drive circuit de-energizes the coil of the electromagnetic relay to connect the movable contact AR to the normally closed contact N/C thereby to brake the DC motor.

In the electromagnetic relay for use in this kind of DC motor drive circuit, in the state in which the DC motor is driven by the direct current through the normally open contact N/O of the electromagnetic relay, if the coil is not energized by the controlling current so that the electromagnetic relay is released, then when the movable contact AR separates from the normally open contact N/O, an arc occurs between the normally open contact N/O and the movable contact AR. If the gap length between the movable contact AR and the normally open contact in the released state of the electromagnetic relay (hereinafter this gap length will be referred to as a "contact gap length" for simplicity) is short, then when the electromagnetic relay is released, the movable contact AR is brought in contact with the normally closed contact N/C before the arc occurred as the movable contact AR is separated from the normally open contact N/O is cut off. As a consequence, the normally closed contact N/C and the normally open contact N/O of the contact group are short-circuited (shorted). There is then the risk that the electromagnetic relay will be degraded.

Accordingly, the contact gap length has been heretofore determined in accordance with the voltage (battery voltage) applied to the power supply at the terminal 3. Ordinary automobiles can be activated by a standard car battery of DC 12V and are able to drive the above-mentioned DC motor drive circuit by an electromagnetic relay in which the contact gap length is 0.3 mm, for example. On the other hand, large automobiles such as a truck and a bus can be activated by a car battery of a high voltage greater than 24V (maximum value is 32), for example. Therefore, such large automobiles require an electromagnetic relay in which the contact gap length is longer than 1.2 mm, for example, to drive the above-mentioned DC motor drive circuit.

Therefore, according to the conventional electromagnetic relay, since the contact gap length increases as the power supply voltage increases, it is unavoidable that the electromagnetic relay becomes large in size. Such large electromagnetic relay becomes troublesome when it is mounted on the printed circuit board. Moreover, since the stroke of the movable contact AR of such large electromagnetic relay lengthens, it is unavoidable that an operating speed of an electromagnetic relay decreases. In particular, recently, as so-called hybrid cars, which can be driven by an engine using electricity together with gasoline and electric cars become commercially available on the market, the voltage of the car battery becomes high increasingly. Therefore, the above-mentioned problem becomes considerably serious.

SUMMARY OF THE INVENTION

In view of the aforesaid aspects, it is an object of the present invention to provide a DC motor drive circuit in which the defect of the short caused by the arc can be avoided without increasing the contact gap length of the electromagnetic relay even when the voltage at the power supply increases.

According to an aspect of the present invention, there is provided a direct current motor drive circuit which is comprised of a contact group operated under control of an electromagnet created when a coil is energized, a direct current motor whose one end is connected to one end of a direct current power supply and a normally closed contact of the contact group and whose other end is connected to a movable contact of the contact group and one to a plurality of normally open contacts connected between one normally open contact of the contact group and the other end of the direct current power supply and openable and closable in unison with the one normally open contact.

In the DC motor drive circuit according to the present invention, when the controlling current is supplied to the coil of the electromagnetic relay in order to drive the DC motor and the movable contact is connected to normally open contact to permit the direct current to flow through the DC motor, the direct current is supplied through a plurality of normally open contacts connected in series to the DC motor.

Therefore, the circuit voltage obtained when the electromagnetic relay is released after the supply of the controlling current to the coil of the electromagnetic relay has been stopped, is applied to a plurality of gaps between the movable contacts (the movable contact is connected to the normally closed contact when the electromagnetic relay is fully released) and the normally open contacts connected in series. As a result, the voltage applied to each of the gaps is divided by the number of the normally open contacts connected in series and thereby the above voltage is decreased.

Therefore, when the supply of the controlling current to the coil of the electromagnetic relay is stopped and the electromagnetic relay is released, even if the arc occurs between the movable contact and the normally open contact N/O, the voltage applied to each of a plurality of gaps between the movable contacts and the normally open contacts connected in series decreases. Thus, even when the contact gap length is reduced, it is possible to avoid the problem of the short caused by the arc. In addition, since a plurality of movable contacts separate from a plurality of normally open contacts connected in series at the same time, the separating speed of the movable contact can increase equivalently.

As described above, according to the present invention, even when the small electromagnetic relay with the short contact gap length is used, the arc occurred when the electromagnetic relay separates the movable contact from the normally open contact can be cut off before the movable contact is returned to the normally open contact.

According to the present invention, it is possible to provide a DC motor drive circuit in which the arc cut-off capability can be improved much more by using a small electromagnetic relay whose arc cut-off capability is not sufficient.

In this specification, a capability for cutting off the arc occurred when the electromagnetic relay separates the movable contact from the normally open contact before the movable contact is returned to the normally open contact will be referred to as an “arc cut-off capability”.

DESCRIPTION OF THE PREFERRED EMBODIMENTS

A DC motor drive circuit according to the present invention will be described below with reference to the drawings.

Figure 3:
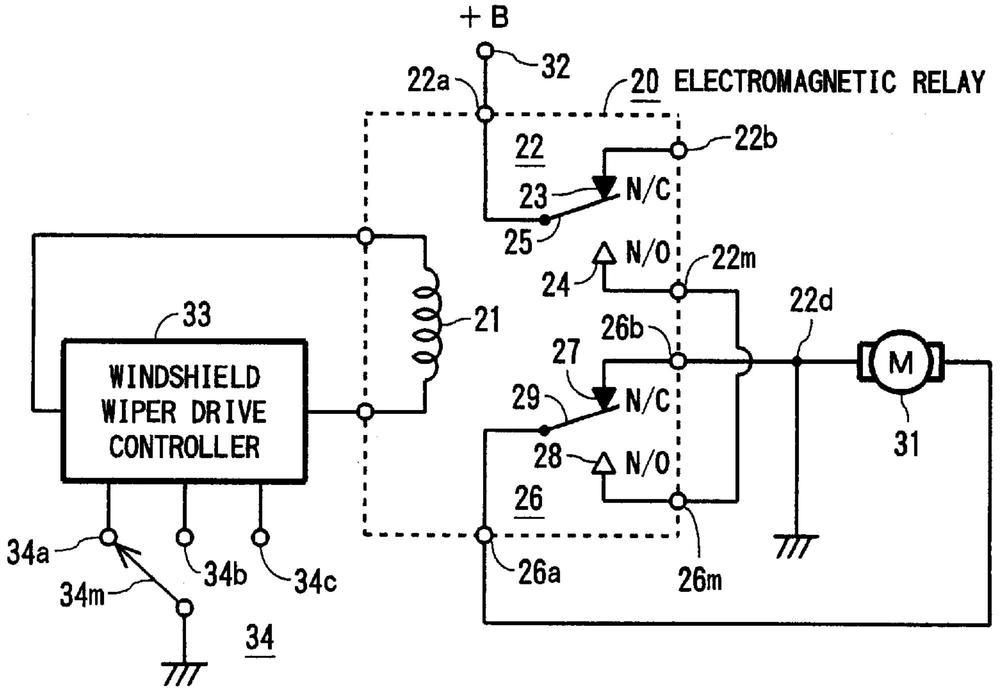
FIG. 3 is a schematic circuit diagram of a DC motor drive circuit applied to a windshield wiper drive control circuit according to an embodiment of the present invention.

FIG. 3 shows an arrangement of an embodiment in which the present invention is applied to a windshield wiper drive section. According to the embodiment shown in FIG. 3, under control of a windshield wiper drive controller 33, an electromagnetic relay 20 for driving and controlling a windshield wiper (hereinafter simply referred to as an “electromagnetic relay 20”) operates to drive and brake a DC motor 31 for driving a windshield wiper (hereinafter simply referred to as a “DC motor 31 ”). According to the embodiment shown in FIG. 3, the electromagnetic relay 20 includes two contact groups of a first contact group 22 and a second contact group 26.

One end of the DC motor 31 is connected to a terminal (hereinafter referred to as a “movable contact terminal”) **26*a* connected to a movable contact 29 of the second contact group 26 of the electromagnetic relay 20. The other end of the DC motor 31 is connected to a terminal (hereinafter referred to as a “normally closed contact terminal”) 26*b* connected to a normally closed contact 27 of the second contact group 26 of the electromagnetic relay 20. A connection point 22*d* between the other end of the DC motor 31 and the normally closed contact terminal 26*b*** is connected to the ground.

A terminal (hereinafter referred to as a “normally open contact terminal”) **26*m* connected to a normally open contact 28 of the second contact group 26 of the electromagnetic relay 20 is connected to a normally open contact terminal 22*m* connected to a normally closed contact 24 of the first contact group 22. A normally closed contact terminal 22*b* with a normally closed contact 23 of the first contact group 22 connected thereto is used as a free end, and a movable contact terminal 22*a* with a movable contact 25 of the first contact group 22 connected thereto is connected to the power supply at a terminal 32**, at which a positive DC voltage (+B) of 24V, for example, is connected from a car battery (not shown).

The windshield wiper drive controller 33 supplies controlling current to a coil 21 to control the two contact groups 22 and 26 of the electromagnetic relay 20 in unison with each other each time a user operates the windshield wiper switch 34. The wiper switch 34 includes three switching positions of "OFF" position, "INTERMITTENT" position and "CONTINUOUS" position. Contacts 34*a*, 34*b*, 34*c* corresponding to the above switching positions are connected to the windshield wiper drive controller 33. When the windshield wiper switch 34 connects its movable contact 34*m* to a desired switching position selected by a user, the windshield wiper is driven in response to the desired switching position under control of the windshield wiper drive controller 33.

Figure 4:
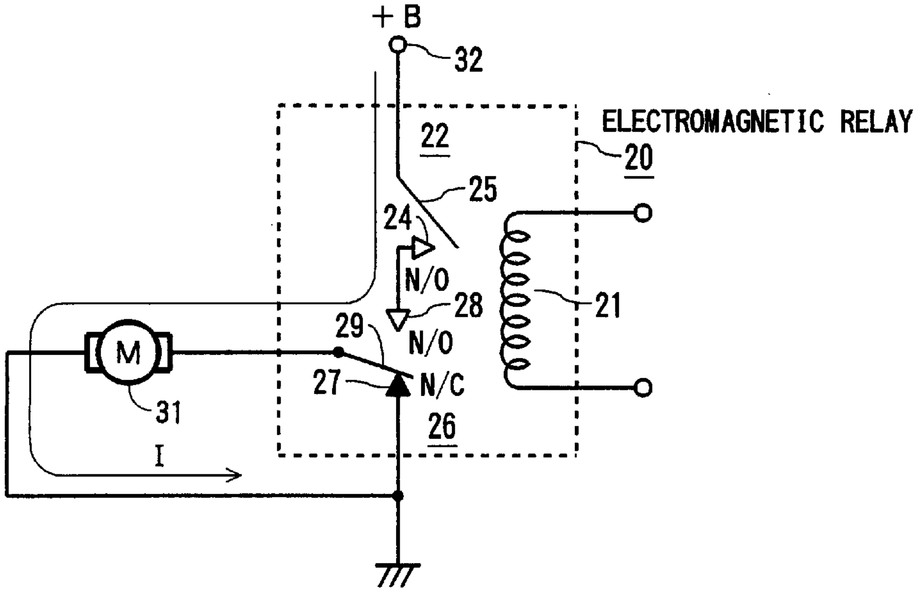
FIG. 4 is a schematic circuit diagram showing a simplified circuit of the DC motor drive circuit in the embodiment shown in FIG. 3.

FIG. 4 shows the DC motor drive circuit shown in FIG. 3 in the form of a simplified circuit arrangement. Operation of the DC motor drive circuit shown in FIG. 3 will be described with reference to FIG. 4 as well as FIG. 3.

While the windshield wiper switch 34 is connecting the movable contact 34*m* to the switching position of the contact 34*a* ("OFF" position), the windshield wiper drive controller supply controlling current to the coil 21 and the coil 21 is not energized so that the electromagnetic relay 20 is not actuated to connect the movable contacts 25, 29 of the two contact groups 22, 26 to both of the normally closed contacts 23, 27. Therefore, the respective ends of the DC motor 31 are connected to each other through a normally closed contact 27 of the second contact group 26 and the DC motor 31 is braked in this state.

While the windshield wiper switch 34 is connecting the movable contact 34*m* to the switching position of the contact 34*b* ("INTERMITTENT" position), the windshield wiper drive controller 33 intermittently supplies controlling current to the coil 21 and the coil 21 is energized to activate the electromagnetic relay 20. While the coil 21 is being energized by controlling current, the electromagnetic relay 20 is connecting the movable contacts 25, 29 of the two contact groups 22, 26 to the normally open contacts 24, 28 in unison with each other substantially at the same time. While the coil 21 is not being energized by controlling current, the electromagnetic relay 21 separates the movable contacts 25, 29 from the normally open contacts 24, 28 in unison with each other substantially simultaneously and connects the movable contacts 25, 29 to the normally closed contacts 23, 27 nearly at the same time.

When the electromagnetic relay 20 connects the movable contacts 25, 29 of the two contact groups 22, 26 to the normally open contacts 24, 28, direct current I flows through the DC motor 31 in the direction shown by an arrow I in FIG. 4 to drive the DC motor 31. When the electromagnetic relay 20 connects the movable contacts 25, 29 of the two contact groups 22, 26 to the normally closed contacts 23, 27, the DC motor 31 is braked. Specifically, while the DC motor 31 is being driven intermittently, the windshield wiper is driven as the DC motor 31 is driven intermittently.

While the windshield wiper switch 34 is connecting the movable contact 34*m* to the switching position of the contact 34*c* ("CONTINUOUS" position), the windshield wiper drive controller 33 continues supplying controlling current to the coil 21 and the coil 21 is energized to activate the electromagnetic relay 20. Therefore, the electromagnetic relay 20 connects the movable contacts 25, 29 of the two contact groups 22, 26 to the normally open contacts 24, 28 in unison with each other substantially simultaneously to allow the direct current I to continuously flow through the DC motor 31 as shown by the arrow I in FIG. 4 and thereby the windshield wiper is driven continuously.

When the windshield wiper switch 34 returns the movable contact 34*m* to the switching position of the contact 34*a* ("OFF" position), the windshield wiper drive controller 33 does not supply controlling current to the coil 21 and the coil 21 is not energized so that the electromagnetic relay 20 is released to connect the movable contacts 25, 29 of the two contact groups 22, 26 to the normally closed contacts 23, 27 in unison with each other substantially simultaneously.

The paragraph "a plurality of movable contacts are substantially simultaneously returned to the normally closed contacts N/C in unison with each other" will be understood such that when the movable contacts of a plurality of contact groups are respectively returned from the normally open contacts N/O to the normally closed contacts N/C, these movable contacts are returned to the normally closed contacts N/C after they have been brought in contact with neither the normally open contacts N/O nor the normally closed contacts N/C.

Specifically, in the paragraph "a plurality of movable contacts are simultaneously returned in unison with each other", a plurality of movable contacts need not always separate from the normally open contacts N/O quite simultaneously and need not contact with the normally closed contacts N/C quite simultaneously. In short, a plurality of movable contacts may contact with neither the normally open contacts N/O nor the normally closed contacts N/C simultaneously.

When a plurality of movable contacts are substantially simultaneously switched to the normally open contacts N/O in unison with each other, it is not essential that a plurality of movable contacts simultaneously contact with neither the normally open contacts N/O nor the normally closed contacts N/C but instead, after a certain movable contact has been fully switched from the normally closed contact N/C to the normally open contact N/O, other movable contacts may be switched from the normally closed contacts N/C to the normally open contacts N/O.

When a plurality of movable contacts are substantially simultaneously returned to the normally closed contacts N/C in unison with each other by a plurality of electromagnetic relays or a plurality of coils, a timing controller such as a delay circuit may be connected to a passage of direct current, for example, in order to control timings at which direct current is supplied to respective coils.

In the above arrangement of the embodiment shown in FIG. 3, as will be easily understood from FIG. 4, the normally open contact 28 of the second contact group 26 of the electromagnetic relay 20 is connected through the normally open contact 24 of the first contact group 22 to the power supply, at a terminal 32 at which a positive DC voltage (+B) is connected. Specifically, the two normally open contacts 24 and 28 are connected in series to the passage of the direct current I which is flowing through the DC motor 31.

Therefore, when the movable contacts 25, 29 of the two contact groups 22, 26 are returned from the normally open contacts 24, 28 to the normally closed contacts 23, 27, if an arc occurs in two gaps between the movable contacts 25, 29 and the normally open contacts 24, 28, then the power supply voltage is applied to the two gaps so that the power supply voltage is divided to decrease the voltage applied to one gap to ½. When the electromagnetic relay 20 is released so that the movable contacts 25, 29 are connected again to the normally closed contacts 23, 27, the power supply voltage is applied to the two gaps between the normally open contacts 24, 28 and the movable contacts 25, 29 in the released state of the electromagnetic relay 20.

Therefore, in the DC motor drive circuit according to this embodiment, the contact gap lengths of the first and second contact groups 22, 26 obtained when the arc cut-off capability is considered may be determined in consideration of the voltage value obtained when the voltage at the power supply is ½ of the voltage at the power supply if the contact gap lengths of the first and second contact groups 22, 26 are equal to each other.

Consequently, even when the contact gap of the contact groups 22, 26 are not sufficient, the above defect of the short caused by the arc can be avoided.

In addition, with the arrangement in which a plurality of normally open contacts, each having a short contact gap length, are connected in series, the separating speed of the normally open contacts from the normally closed contacts can increase. Specifically, according to the present invention, a plurality of normally open contacts, each having the short contact gap length, are connected in series and hence the lengths of the contact gaps to which the voltage at the power supply is applied can increase equivalently. The separating speeds of the normally open contacts with respect to the contact gaps of the equivalent length may be replaced with the separating speed of one normally open contact because the respective normally open contacts connected in series separate from the normally closed contacts substantially at the same time. Therefore, the separating speed can increase as compared with the case in which the contact gaps of the equivalent lengths are realized by one contact group.

From this point of view, according to the DC motor drive circuit of this embodiment, it is possible to improve the arc cut-off capability of the electromagnetic relay having the short contact gap length.

According to the DC motor drive circuit of this embodiment, even when the voltage at the battery increases, the contact gap length of the electromagnetic relay need not be increased, and hence the DC motor drive circuit can use a small electromagnetic relay. Furthermore, even when the voltage at the battery serving as the power supply increases, the contact gap length need not be increased, and hence the DC motor drive circuit can use an electromagnetic relay of which the operating speed is high.

In FIG. 3, the normally open contact terminal 26*m* of the second contact group 26 may be connected to the movable contact terminal 22*a* of the first contact group 22 and the normally open contact terminal 22*m* of the first contact group 22 may be connected to the power supply terminal 32 with similar action and effects being achieved.

Figure 5:
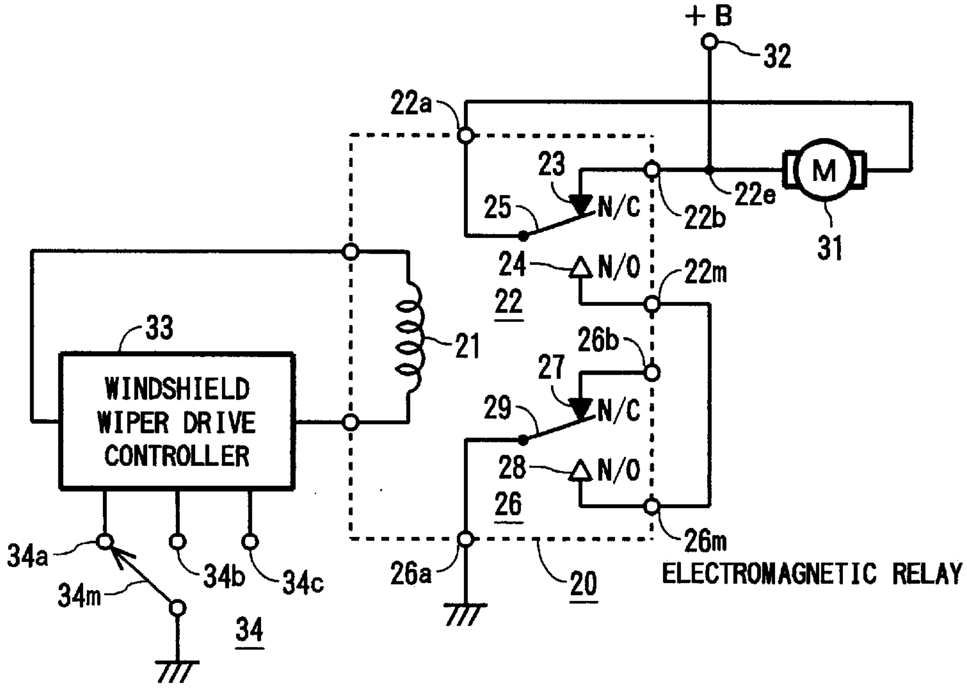
FIG. 5 is a schematic circuit diagram showing a modified example of the DC motor drive circuit in the embodiment shown in FIG. 3.

While one end of the DC motor 31 is grounded according to the embodiment shown in FIG. 3, the present invention is not limited thereto, and one end of the DC motor 31 may be connected to the power supply terminal 32. FIG. 5 shows an example of a circuit arrangement obtained when one end of the DC motor 31 is connected to the power supply terminal 32. Those parts in FIG. 3 are denoted by identical reference numerals.

According to this embodiment, as shown in FIG. 5, one end of the DC motor 31 is connected to the movable contact terminal 22*a* of the first contact group 22 of the electromagnetic relay 20. The other end of the DC motor 31 is connected to the normally closed contact terminal 22*b* of the first contact group 22 of the electromagnetic relay 20, and a connection point 22*e* between the other end of the DC motor 31 and the normally closed contact terminal 22*b* is connected to the power supply at the terminal 32, at which the positive DC voltage (+B) is connected from the car battery (not shown).

The normally open contact terminal 22*m* of the first contact group 22 of the electromagnetic relay 20 is connected to the normally open contact terminal 26*m* of the second contact group 26. The normally closed contact terminal 26*b* of the second contact group 26 is the free end, and the movable contact terminal 26*a* of the second contact group 26 is grounded. A rest of arrangement in FIG. 5 is exactly the same as that of the embodiment shown in FIG. 3.

Figure 6:
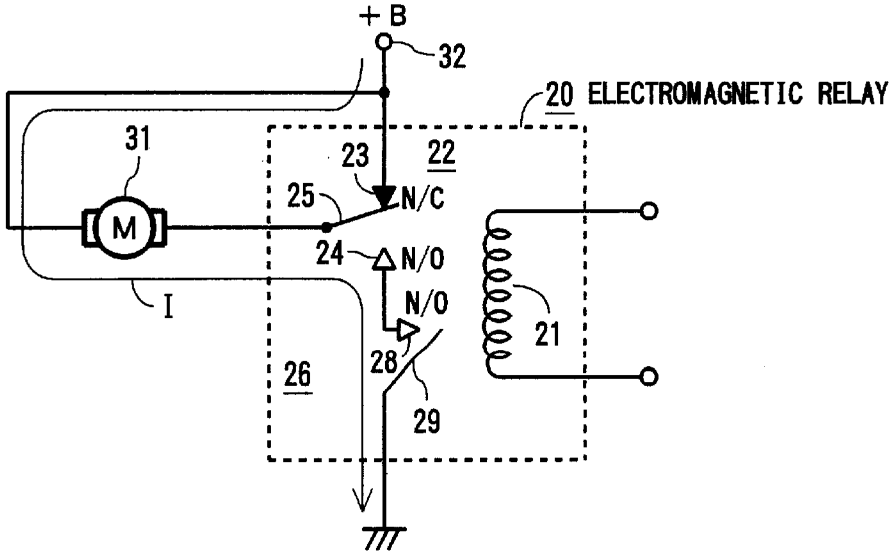
FIG. 6 is a schematic circuit diagram showing a simplified circuit of the modified example of the DC motor drive circuit shown in FIG. 5.

FIG. 6 shows the DC motor drive circuit of FIG. 5 in the form of more simplified circuit arrangement. The DC motor drive circuit according to the embodiment shown in FIG. 5 also can achieve exactly the same action and effects as those of the DC motor drive circuit according to the embodiment shown in FIG. 3.

Also in the circuit arrangement shown in FIG. 5, the normally open contact terminal 22*m* of the first contact group 22 may be connected to the movable contact terminal 26*a* of the second contact group 26 and the normally open contact terminal 26*m* of the second contact group 26 may be connected to the ground with similar action and effects being achieved.

In the embodiment shown in FIG. 3 or FIG. 5, the first and second contact groups 22 and 26 may be comprised of different electromagnetic relays, respectively. In that case, the windshield wiper drive controller 33 may supply controlling current to the respective different electromagnetic relays at the same time so that the respective different electromagnetic relays can be controlled substantially simultaneously in unison with each other.

When the different electromagnetic relays are controlled in unison with each other, timings at which those electromagnetic relays are released to connect the respective movable contacts of the respective contact groups from the normally open contacts N/O to the normally closed contacts N/C are controlled similarly as described before, if necessary, in such a manner that a plurality of movable contacts are connected to the normally closed contacts N/C since those movable contact had been brought in contact with neither the normally open contacts N/C nor the normally closed contacts N/C.

From a timing control standpoint, if one electromagnetic relay switches a plurality of movable contacts by using one coil like the embodiment shown in FIG. 3 or 5, then the above timing control becomes easy or unnecessary.

While the respective terminals are led out from the respective contacts of the respective contact groups and the normally open contact 24 of the first contact group 22 and the normally open contact 28 of the second contact group are connected in series by connecting the normally open contact terminals 22*m*, 28*m* of the first and second contact groups 22, 28 as described above, the present invention is not limited thereto, and an electromagnetic relay in which normally open contacts are connected in series within its housing may be prepared and used as the above automobile assembly.

Figure 7:
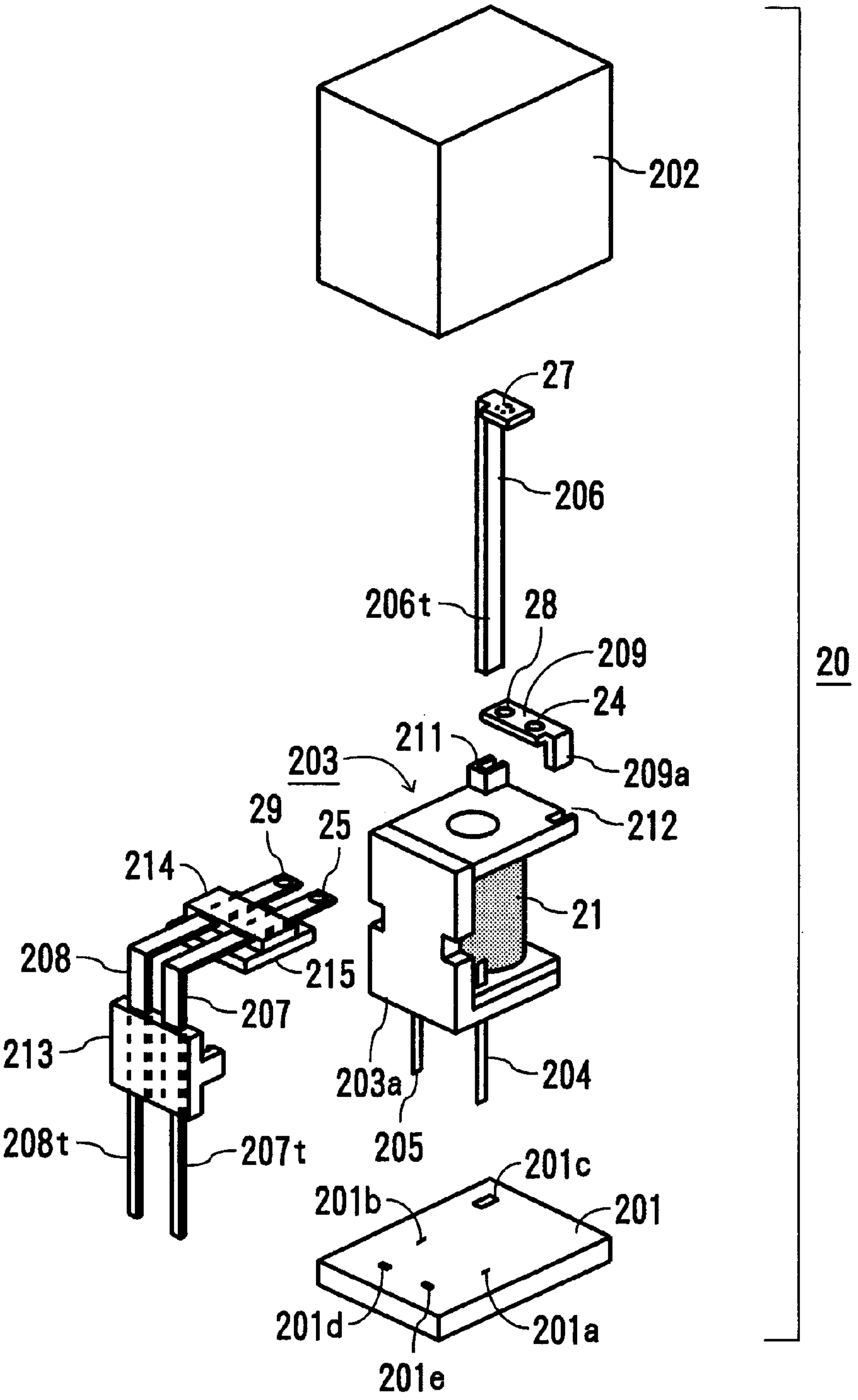
FIG. 7 is an exploded, perspective view showing an example of an electromagnetic relay for use in the DC motor drive circuit shown in FIG. 3.

FIG. 7 shows an example of a structure of the windshield wiper driving and controlling electromagnetic relay 20 shown in FIG. 3. In this example, normally open contacts of two contact groups are connected in series within the housing and normally open contact terminals are omitted. FIG. 7 is an exploded, perspective view of the electromagnetic relay 20.

Respective assemblies of the electromagnetic relay shown in FIG. 7 are assembled on a terminal board 201, and the assembled parts are enclosed when a cover 202 is joined to the terminal board 201. A housing of the electromagnetic relay 20 in this example is comprised of the terminal board 201 and the cover 202.

As shown in FIG. 7, the electromagnetic relay 20 includes an electromagnet assembly 203 in which a coil 21 with an iron-core is supported by an L-shaped yoke 203*a*. The electromagnet assembly 203 includes coil terminals 204, 205 made of a conductive material to which one and the other end of the coil 21 are connected. The coil terminals 204, 205 are extended through the terminal board 201 from through-holes 201*a*, 201*b* to the outside.

A common normally open contact plate 209 is made of a conductive material, and the normally open contact 24 of the first contact group 22 and the normally open contact 28 of the second contact group 28 are formed on the common normally open contact plate 209. The common normally open contact plate 209 is provided with a folded strip 209*a*. When this folded strip 209*a* is fitted into a concave groove 212 on the electromagnet assembly 203, the common normally open contact plate 209 is attached to the electromagnet assembly 203. No terminals are led out from the common normally open contact plate 209 to the outside of the housing of the electromagnetic relay 20.

A normally closed contact plate 206 is a conductive normally closed contact plate with the normally closed contact 27 of the second contact group 26 formed thereon. In this example, the normally closed contact plate 206 is fitted into an insertion groove 211 on the electromagnet assembly 203 and thereby attached to the electromagnet assembly 203. In that case, the normally closed contact plate 206 is attached to the electromagnet assembly 203 in such a manner that the normally closed contact 27 and the normally open contact 28 on the common normally open contact plate 209 are spaced apart with a predetermined gap length. The insertion groove 211 is formed at a height equal to a distance between the normally open contact 28 and the normally closed contact 27.

A normally closed contact terminal 206*t* is integrally formed with the normally closed contact plate 206. The normally closed contact terminal 206*t* is extended through the terminal board 201 at the through-hole 201*c* to the outside.

Movable contact springs 207, 208 are made of a conductive material, and the movable contact 25 is formed on the movable contact spring 207, the movable contact 29 being formed on the movable contact spring 208. In this example, these movable contact springs 207, 208 are stuck together with insulators 213, 214 and attached to an armature plate 215 made of a magnetic material to produce an armature assembly.

Specifically, in this example, the two movable contact springs 207, 208 are shaped as substantially L-letter, and while they are laid side by side as shown in FIG. 7, the two movable contact springs 207, 208 are stuck together with the insulators 213, 214 at respective sides across the position at which they are bent like L-shape. The process for sticking the two movable contact springs 207, 208 is based on insert molding using an insulating resin as the insulators 213, 214, for example.

The armature plate 215 made of a magnetic material is stuck to the insulator 214 on the side in which the movable contacts 25, 29 are formed on the movable contact springs 207, 208 to produce the armature assembly.

The armature assembly containing the movable contact springs 207, 208 is attached to the electromagnet assembly 203 at its portion corresponding to the insulator 213. When the coil 21 is not energized, the movable contact 29 on the movable contact spring 208 is brought in contact with the normally closed contact 27 and is also spaced apart from the normally open contact 28 with a predetermined gap length, the movable contact 25 on the movable contact spring 207 being spaced apart from the normally open contact 24 with a predetermined gap length.

While the armature assembly is being attached to the electromagnet assembly 203, the armature plate 215 is attracted by a magnetic attraction from an electromagnet created when the coil 21 of the electromagnet assembly 203 is energized. The armature plate 215 is stuck to the two movable contact springs 207, 208, and hence the two movable contact springs 207, 208 are operated simultaneously in accordance with the movement of the armature plate 215.

A movable contact terminal 207*t* of the movable contact spring 207 is extended through the terminal board 201 at the through-hole 201*d* to the outside, and a movable contact terminal 208*t* of the movable contact spring 208 is extended through the terminal board 201 at the through-hole 201*e* to the outside.

With the above arrangement of the electromagnetic relay 20 according to the second embodiment, while the coil 21 is not being energized, the armature plate 215 is attracted toward the electromagnet assembly 203, and hence the movable contact springs 207, 208 are not displaced toward the common normally open contact plate 209 so that the movable contact 29 of the second contact group 26 is spaced apart from the normally open contact 28 and connected to the normally closed contact 27, the movable contact 25 of the first contact group 22 being spaced apart from the normally open contact 24.

When current flows through the coil 21 from the coil terminals 204, 205 and the coil 21 is energized, the armature plate 215 is attracted toward the electromagnet assembly 203. Hence, the movable contact springs 207, 208 are simultaneously displaced toward the normally open contact plate 209 so that the movable contacts 25, 29 are respectively connected to the normally open contacts 24, 28 simultaneously.

Therefore, the two normally open contacts 24, 28 are connected in series between the terminal 207*t* of the movable contact spring 207 and the terminal 208*t* of the movable contact spring 208.

When the supply of current to the coil 21 is stopped, a magnetic attraction exerted upon the armature plate 215 from the electromagnet assembly 203 is withdrawn, and hence the movable contact springs 207, 208 are returned to the original state in which they separate from the normally open contacts 24, 28 of the common normally open contact plate 209 by their own spring force substantially simultaneously, the movable contact 29 is connected to the normally closed contact 27 and the movable contact 25 separates from the normally open contact 24.

When the electromagnetic relay 20 is connected in the same way as the electromagnetic relay is connected in the DC motor drive circuit shown in FIG. 3, the equivalent contact gap length to which the voltage at the power supply is applied makes a sum of a gap length g1 between the movable contact 29 and the normally open contact 28 and a gap length g2 between the movable contact 25 and the normally open contact 24. As a consequence, the voltage at the power supply is divided and then applied to the respective gap lengths g1, g2. Therefore, the values of the gap lengths g1, g2, which are enough as the above arc cut-off capability, can decrease as compared with the case in which the voltage at the power supply is applied to one contact gap.

In the case of this example, since the contact gap length required by the electromagnetic relay 20 is the gap length g1 (or the gap length g2 where the gap lengths g1 and g2 are nearly equal), the gap length can decrease to almost ½ as compared with the case of the contact gap of one contact group, and hence the electromagnetic relay 20 may be small in size.

The electromagnetic relay 20 according to this embodiment is arranged without an armature card-like portion, and hence assemblies can decrease.

According to the arrangement of this embodiment, since the two movable contact springs 207, 208 are fixed to the armature plate 215 by the insulators 213, 214, when one of the two movable contacts 25, 29 and one of the normally open contacts 24, 28 are joined by fusion-welding, the other of the two movable contacts 25, 29 also is not returned to the release position. Consequently, even when the movable contact 25 which is not in contact with the normally closed contact and the normally open contact 24 are joined by fusion-welding, the other movable contact 29 is not returned to the normally closed contact 27. Therefore, the normally open contact and the normally closed contact can be protected from the dead-short caused by the continuing arc occurring when the movable contact of the electromagnetic relay separates from the normally open contact.

Therefore, even when the above fusion-welding occurs, only the electromagnetic relay is destroyed and circuit elements such as a controller on the same circuit board can be avoided from being destroyed.

Next, other embodiment in which the DC motor drive circuit according to the present invention is applied to the power window drive section will be described.

Figure 2:
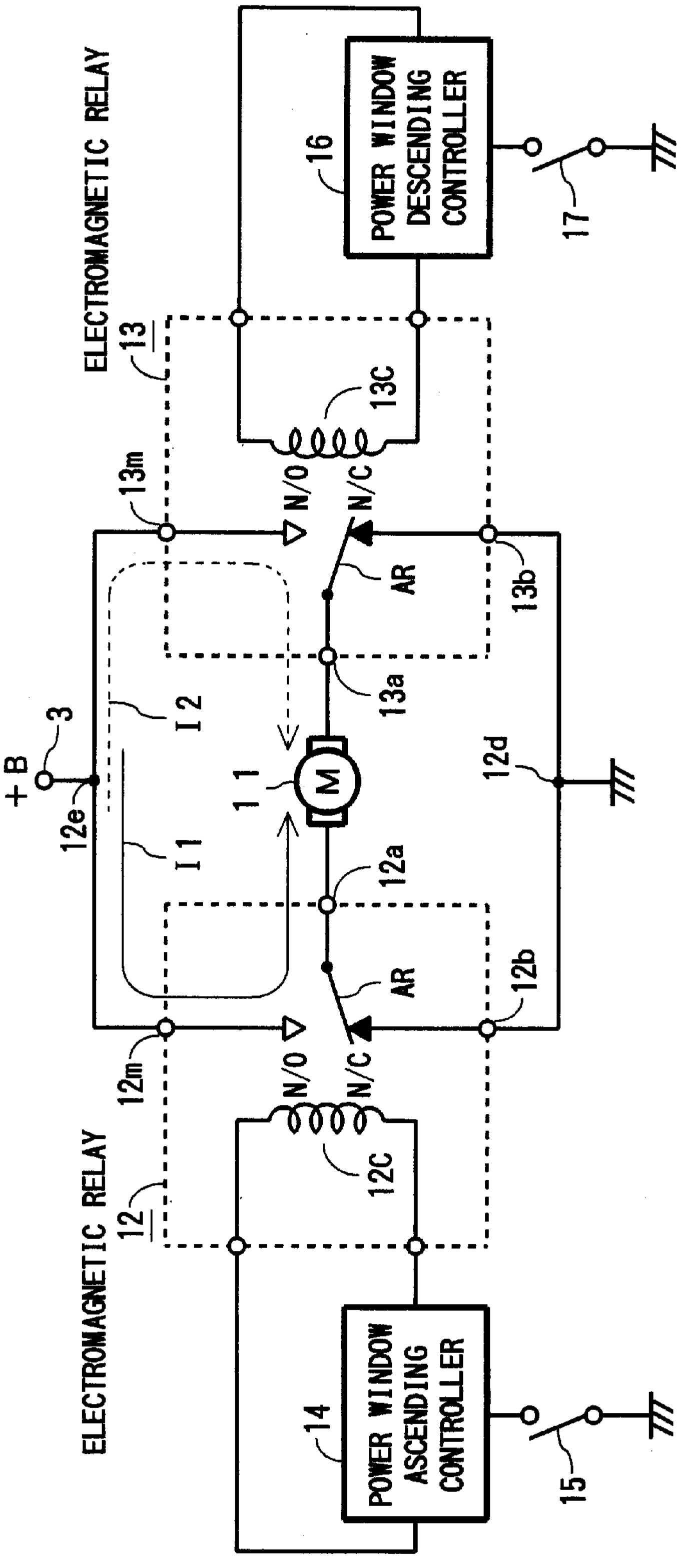
FIG. 2 (PRIOR ART)
FIG. 2 is a schematic circuit diagram showing another example of a conventional DC motor drive circuit for use in a drive section of a mechanism for moving a power window of automobile upward or downward.
Figure 8:
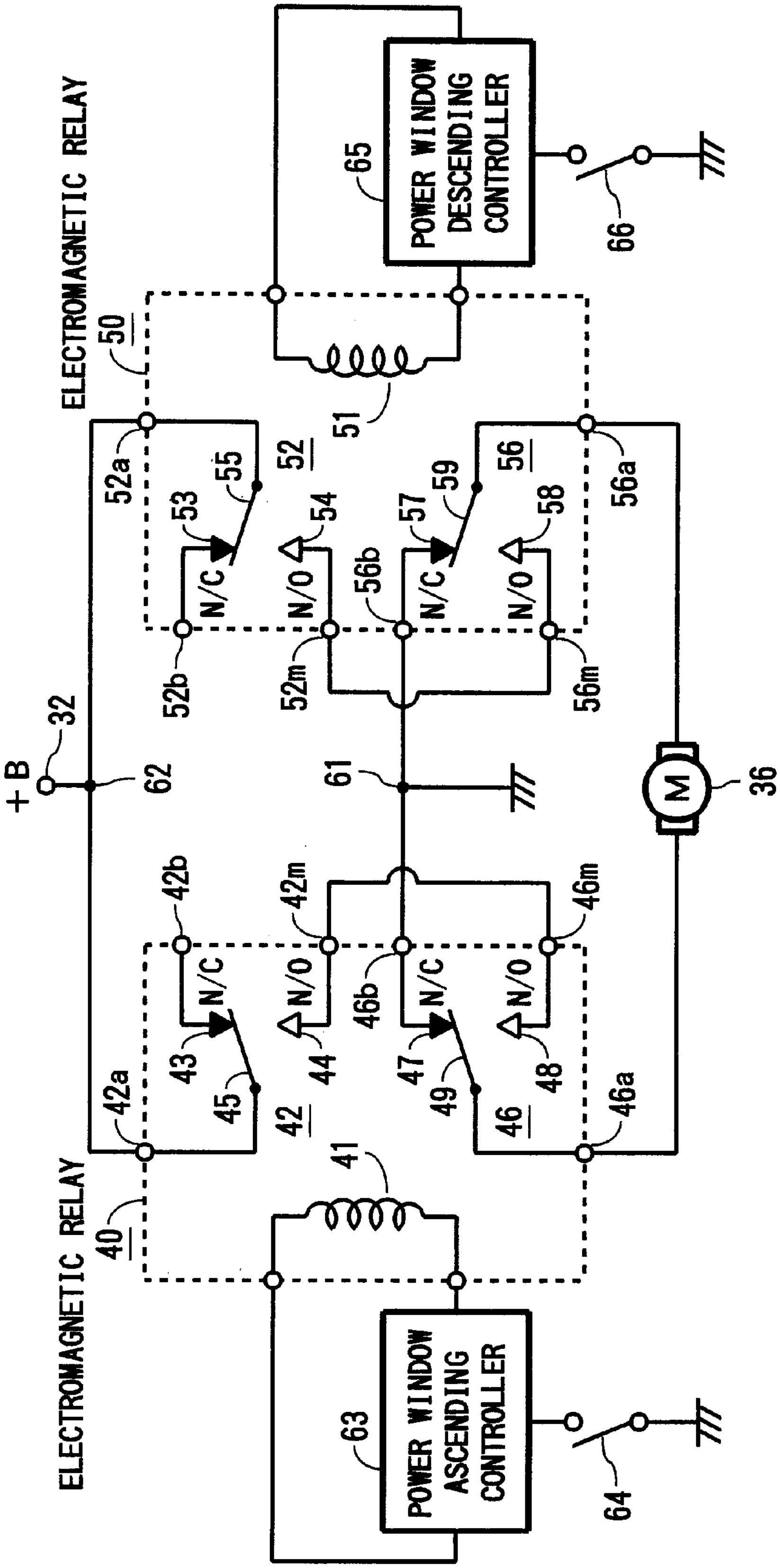
FIG. 8 is a schematic circuit diagram showing a DC motor drive circuit applied to a power window drive section according to an embodiment of the present invention.

FIG. 8 shows an arrangement of the embodiment in which the present invention is applied to the power window drive section. In the embodiment shown in FIG. 8, the electromagnetic relays 12, 13 in the conventional power window drive section shown in FIG. 2 are replaced with electromagnetic relays 40, 50 including two contact groups similar to those of the above embodiment.

Specifically, as shown in FIG. 8, one end of a DC motor 36 for driving a power window is connected to a movable contact terminal 46*a* to which a movable contact 48*a* of a second contact group 46 of the window ascending control electromagnetic relay 40 is connected. The other end of the DC motor 36 is connected to a movable contact terminal 52*a* with a movable contact 59 of a second contact group 52 of the window descending control electromagnetic relay 50 connected thereto.

A normally closed contact terminal 46*b* connected to a normally closed contact 47 of the second contact group 46 of the electromagnetic relay 40 and a normally closed contact terminal 56*b* connected to a normally closed contact 57 of the second contact group 56 of the electromagnetic relay 50 are connected to each other, its connection point 61 being grounded.

A normally open contact terminal 46*m* with the normally open contact 48 of the second contact group 46 of the electromagnetic relay 40 connected thereto is connected to a normally open contact terminal 42*m* with a normally open contact 44 of a first contact group 41 connected thereto, and a normally closed contact terminal 42*b* with a normally closed contact 43 of the first contact group 41 makes a free end.

A normally open contact terminal 56*m* with the normally open contact 58 of the second contact group 56 of the electromagnetic relay 50 connected thereto is connected to a normally open contact terminal 52*m* with a normally open contact 54 of the first contact group 52 connected thereto, and a normally closed contact terminal 52*b* with a normally closed contact 53 of the first contact group 52 connected thereto makes a free end.

A movable contact terminal 42*a* with a movable contact 45 of the first contact group 42 of the electromagnetic relay 40 connected thereto and a movable contact terminal 52*a* with a movable contact 55 of the first contact group 52 of the electromagnetic relay 50 connected thereto are connected to each other, its connection point 62 being connected to the power supply at the terminal 32, at which a positive DC voltage (+B) is connected.

A power window ascending controller 63 supplies controlling current responsive to user's operation to move a power window upward to the coil 41 of the electromagnetic relay 40. A switch 64, which is being energized by the user to move the power window upward, is connected to the power window ascending controller 63. A power window descending controller 65 supplies controlling current responsive to user's operation to move a power window downward to the coil 51 of the electromagnetic relay 50. A switch 66, which is energized by a user to move a power window downward, is connected to the power window descending controller 65.

Figure 9:
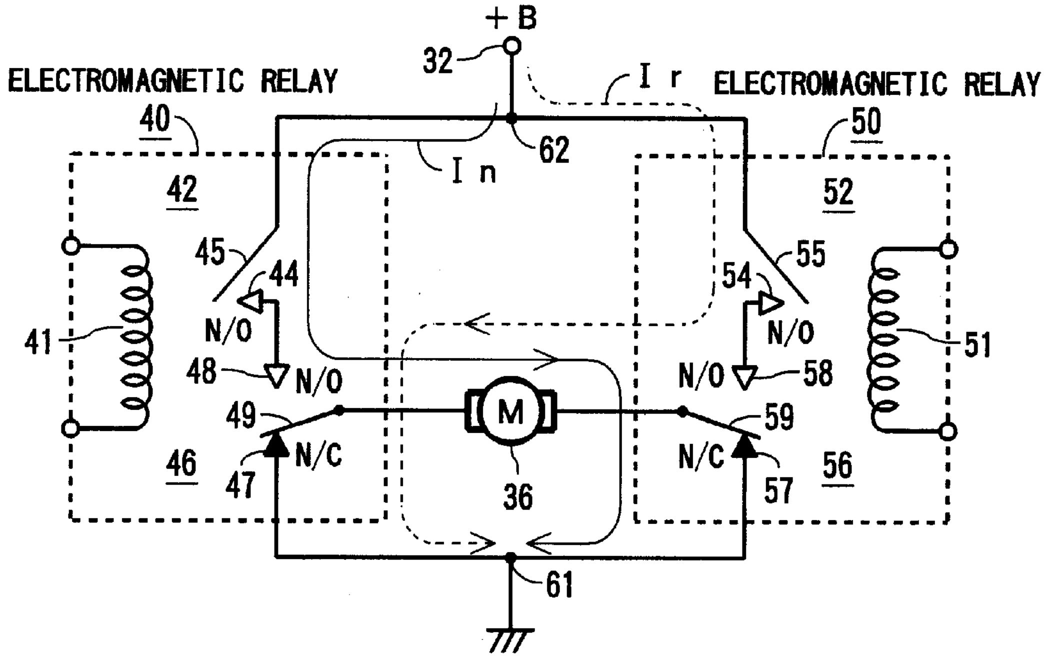
FIG. 9 is a schematic circuit diagram showing a simplified circuit of the embodiment shown in FIG. 8.

FIG. 9 shows the circuit arrangement shown in FIG. 8 in the form of a more simplified circuit arrangement. Operation of the DC motor drive circuit shown in FIG. 8 will be described with reference to FIG. 9 as well as FIG. 8.

While a user is operating the power window drive section to move the power window upward, the switch 64 is being energized to permit the power window ascending controller 63 to supply controlling current to the coil 41 of the electromagnetic relay 40 to energize the coil 41 so that the electromagnetic relay 40 is activated to connect the movable contacts 45, 49 of the first and second contact groups 42, 49 to the normally open contacts 44, 48 in unison with each other substantially simultaneously. Accordingly, direct current In flows through the DC motor 36 in the direction shown by a solid-line arrow In in FIG. 9 and thereby the DC motor 36 is driven in the positive direction, for example. Therefore, the power window of automobile is moved upward.

When the user stops operating the power window drive section to move the power window upward, the switch 64 is de-energized and no controlling current flows through the coil 41 of the electromagnetic relay 40 so that the electromagnetic relay 40 is released to connect the movable contacts 45, 49 of the two contact groups 42, 46 to the normally closed contacts 43, 47 in unison with each other substantially simultaneously. Therefore, the DC motor 36 is braked to stop the upward movement of the power window.

While the user is operating the power window drive section to move the power window downward, the switch 66 is being energized to permit the power window descending controller 54 to supply controlling current to the coil 51 of the electromagnetic relay 50 to energize the coil 51 so that the electromagnetic relay 50 is activated to connect the movable contacts 55, 59 of the two contact groups 52, 56 to the normally open contacts 54, 58 in unison with each other substantially simultaneously. Accordingly, direct current Ir flows through the DC motor 36 in the direction shown by a dashed-line arrow Ir in FIG. 9 to drive the DC motor 36 in the opposite direction. Therefore, the power window is moved downward.

When the user stops operating the power window drive section to move the power window downward, the switch 66 is de-energized to inhibit the power window descending controller 65 from supplying controlling current to the coil 51 of the electromagnetic relay 50 so that the electromagnetic relay 50 is released to connect the movable contacts 55, 59 of the two contact groups 52, 56 to the normally closed contacts 54, 58 in unison with each other substantially simultaneously. Therefore, the DC motor 36 is braked to stop the downward movement of the power window.

Also in this embodiment in which the DC motor drive circuit according to the present invention is applied to the power window drive section, the normally open contacts 48, 58 of the second contact group 46 or 56 of the electromagnetic relay 40 or 50 are connected through the normally open contacts 44, 48 of the first contact group 42 or 52 to the power supply at the terminal 32, and the two normally open contacts N/O are connected in series to a passage of the direct current shown by the arrow In or Ir which flows through the DC motor 36.

Therefore, also in this embodiment, similarly to the aforementioned embodiment, even when the DC motor drive circuit uses the electromagnetic relays 40, 50 in which the contact gap lengths of the respective contact groups are short, the arc cut-off capability can be improved. Specifically, the DC motor drive circuit according to this embodiment can use the small electromagnetic relay with the short contact gap length even when the voltage at the power supply increases.

In FIG. 8, the electromagnetic relay may connect the normally open contact terminal 46*m* of the second contact group 46 to the movable contact terminal 42*a* of the first contact group 42 and may connect the normally open contact terminal 42*m* of the first contact group 42 to the power supply at the terminal 32 and the electromagnetic relay 50 may connect the normally open contact terminal 56*m* of the second contact group 56 to the movable contact terminal 52*a* of the first contact group 52 and may connect the normally open contact terminal 52*m* of the first contact group 52 to the power supply at the terminal 32 with similar action and effects being achieved.

Figure 10:
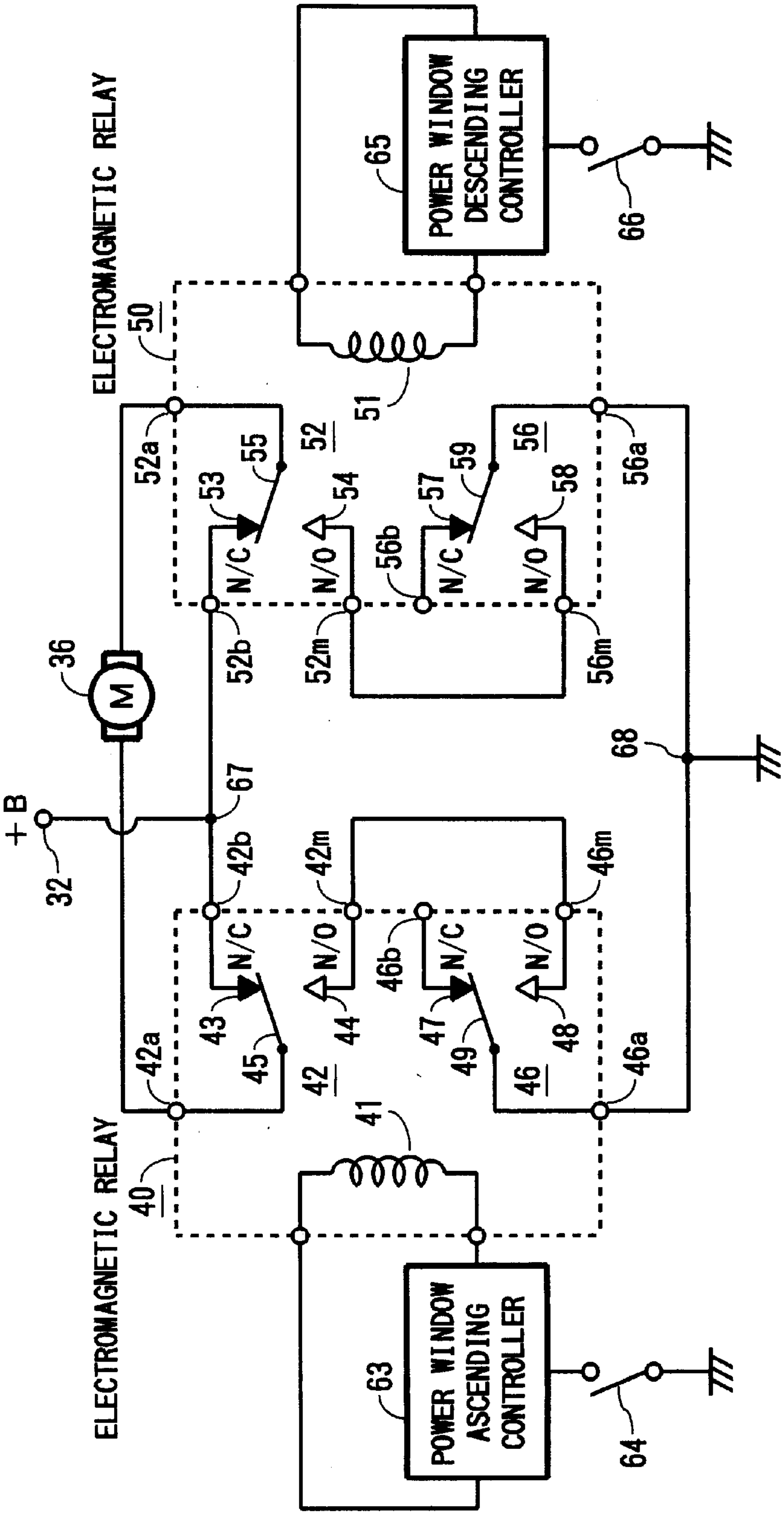
FIG. 10 is a schematic circuit diagram showing a DC motor drive circuit applied to a power window drive section according to other embodiment of the present invention.

While the respective ends of the DC motor 36 are connected to the ground when the DC motor 36 is braked according to the embodiment shown in FIG. 8, the present invention is not limited thereto, and the respective ends of the DC motor 36 can be connected to the power supply at the terminal 32 when the DC motor 36 is braked. FIG. 10 shows the above modified example of the DC motor drive circuit, and those parts in FIG. 8 are denoted by identical reference numerals.

According to this embodiment, as shown in FIG. 10, one end of the DC motor 36 is connected to the movable contact terminal 42*a* of the first contact group 42 of the electromagnetic relay 40. The other end of the DC motor 36 is connected to the movable contact terminal 52*a* of the first contact group 52 of the electromagnetic relay 50. The normally closed contact terminal 42*b* of the first contact group 42 of the electromagnetic relay 40 and the normally closed contact terminal 52*b* of the first contact group 52 of the electromagnetic relay 50 are connected to each other, its connection point 67 being connected to the power supply at the terminal 32.

The normally open contact terminal 42*m* of the first contact group 42 of the electromagnetic relay 40 is connected to the normally open contact terminal 46*m* of the second contact group 46. The normally open contact terminal 52*m* of the first contact group 52 of the electromagnetic relay 50 is connected to the normally open contact terminal 56*m* of the second contact group 56.

The respective normally closed contact terminals 46*b* and 56*b* of the second contact groups 46, 56 of each of the electromagnetic relays 40, 50 make free ends, and the movable contact terminals 46*a*, 56*a* of the second contact groups 46, 56 of the electromagnetic relays 40, 50 are connected to each other, its connection point 68 being grounded. A rest of the arrangement is exactly the same as that of the embodiment shown in FIG. 8.

Figure 11:
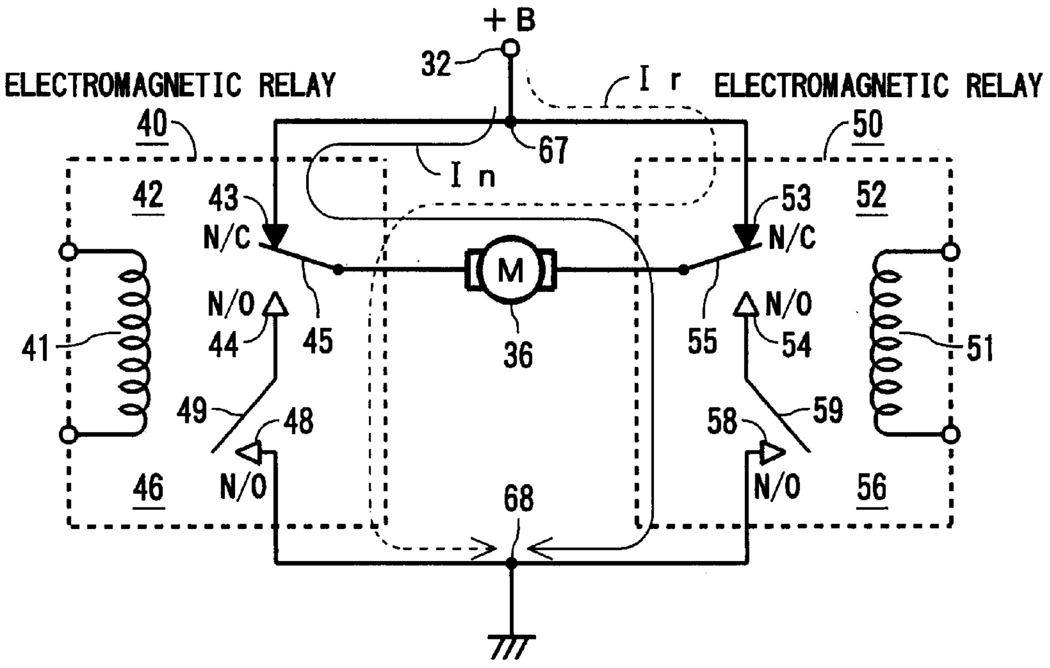
FIG. 11 is a schematic circuit diagram showing a simplified circuit of the embodiment shown in FIG. 10.

FIG. 11 shows the power window drive section shown in FIG. 10 in the form of a more simplified circuit arrangement. The embodiment shown in FIG. 10 can achieve exactly the same action and effects as those achieved by the embodiment shown in FIG. 8.

Also in the arrangement shown in FIG. 10, if the electromagnetic relay 40 connects the normally open contact terminal 42*m* of the first contact group 42 to the movable contact terminal 46*a* of the second contact group 46 and connects the normally open contact terminal 46*m* of the second contact group 46 to the ground and the second electromagnetic relay 50 connects the normally open contact terminal 52*m* of the second contact group 52 to the movable contact terminal 56*a* of the second contact group 56 and connects the normally open contact terminal 56*m* of the second contact group 56 to the ground, then similar action and effects can be achieved.

The first and second contact groups 42, 46 may be comprised of different electromagnetic relays. Similarly, the first and second contact groups 52, 56 may be comprised of different electromagnetic relays. In that case, the power window ascending controller 63 or the power window descending controller 64 may supply controlling current to those different electromagnetic relays so that those different electromagnetic relays may be controlled substantially simultaneously in unison with each other.

When those different electromagnetic relays are controlled in unison with each other, similarly as described above, timing should be controlled according to the necessity in such a fashion that when those electromagnetic relays are released to connect the respective movable contacts of the respective contact groups from the normally open contacts N/O to the normally closed contacts N/C, these movable contacts are connected to the normally closed contacts N/C after these movable contacts had been in contact with neither the normally open contacts N/O nor the normally closed contacts N/C.

When a plurality of movable contacts are substantially simultaneously switched in unison with each other by a single coil as shown in FIGS. 8 and 10, the above timing control can be made easy or made unnecessary.

Instead of the two electromagnetic relays 40, 50 now in use, there can be used a single electromagnetic relay in which a plurality of contacts operable under control of these coils are stored in a single housing.

With the above arrangement of the single electromagnetic relay, not only the above timing control can be made easy or made unnecessary but also the power window can be moved upward or downward under control of the single electromagnetic relay.

Figure 12:
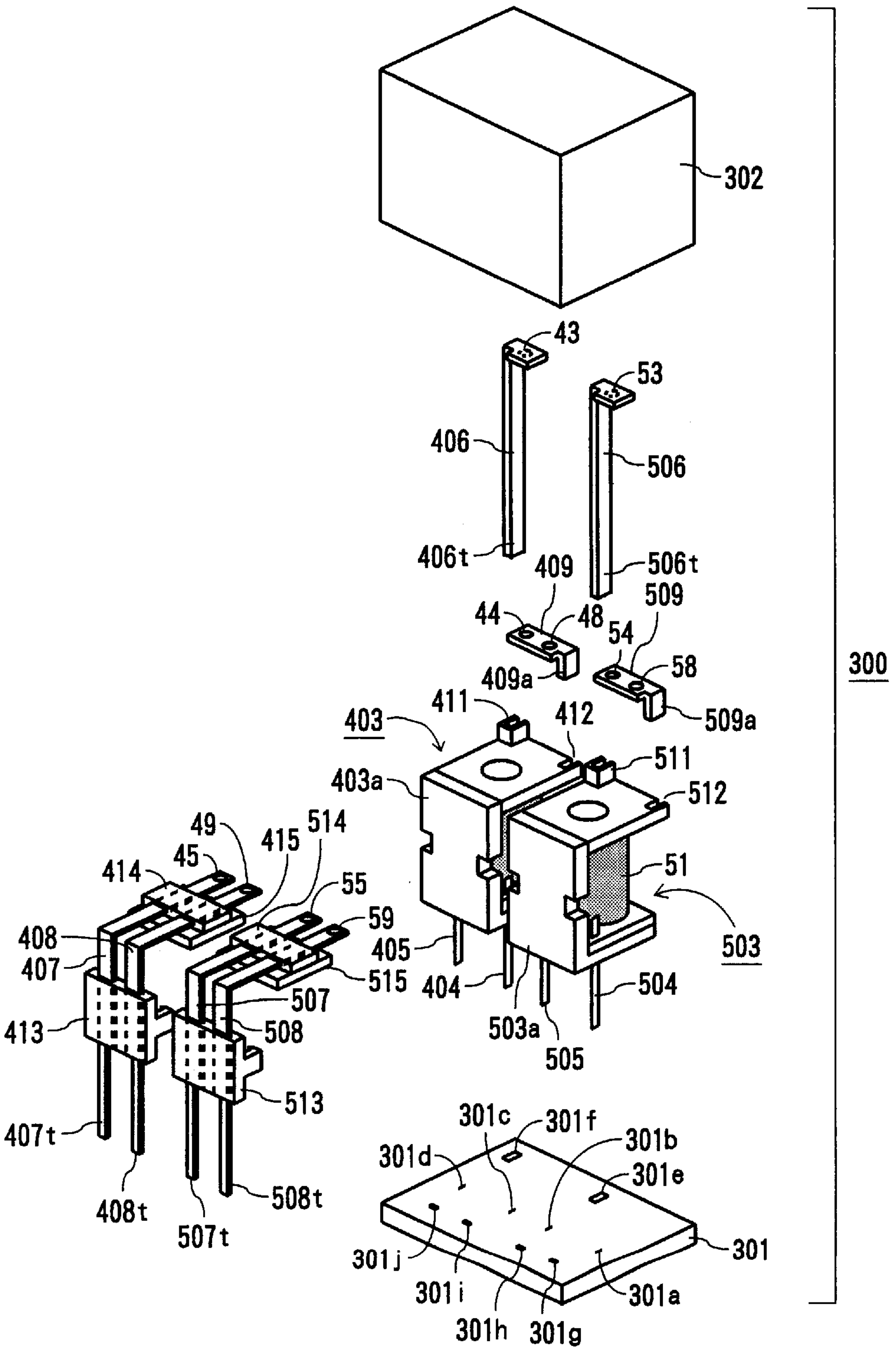
FIG. 12 is an exploded, perspective view showing an example of an electromagnetic relay for use in the DC motor drive circuit shown in FIG. 10.

FIG. 12 shows an example of one electromagnetic relay 300 in which the functions of the above two electromagnetic relays 40 and 50 are stored in one housing. FIG. 12 is an exploded, perspective view of the electromagnetic relay 300.

Assemblies of the electromagnetic relay 300 shown in FIG. 12 are assembled on a terminal board 301. Assembled parts are enclosed when a cover 302 is joined to the terminal board 301. A housing of the electromagnetic relay 300 is comprised of the terminal board 301 and the cover 302. The terminal board 301 has through-holes 301*a*, 301*b*, 301*c*, 301*d*, 301*e*, 301*g*, 301*h*, 301*i*, 301*j* from which terminals are led out to the outside of the housing of the electromagnetic relay 300.

The example of the electromagnetic relay 300 shown in FIG. 12 is substantially equal to the example in which the electromagnetic relay 20 shown in FIG. 7 is used as the internal parts corresponding to each of the electromagnetic relays 40 and 50 shown in FIG. 10.

In FIG. 12, parts denoted by reference numerals 400*s* following reference numeral 403 identify parts corresponding to the electromagnetic relay shown in FIG. 10, and parts denoted by reference numerals 500*s* following reference numeral 503 identify parts corresponding to the electromagnetic relay 50 shown in FIG. 8. In order to understand this embodiment more clearly, normally closed contacts, normally open contacts, movable contacts and coils in FIG. 12 are denoted by identical reference numerals of the electromagnetic relays 40 and 50 shown in FIG. 10.

Electromagnet assemblies are generally denoted by reference numerals 403, 503 in FIG. 12, and the electromagnet assemblies 403, 503 include L-shaped yokes 403*a*, 503*a* to support coils 41, 51 with iron-cores. The electromagnet assemblies 403, 503 include coil terminals 404, 405 and 504, 505, each made of a conductive material, with one end and the other end of the coils 41, 51 connected thereto. These coil terminals 404, 405, 504, 505 are extended through the terminal board 301 from the through-holes 301*a*, 301*b*, 301*c*, 301*d* to the outside.

A common normally open contact plate 409 is a contact plate on which normally open contacts 44, 48 are formed in common. A common normally open contact plate 509 is a contact plate on which normally open contacts 54, 58 are formed in common.

These common normally open contact plates 409, 509 include folded strips 409*a*, 509*a*. When the folded strips 409*a*, 509*a* are fitted into concave grooves 412, 512 on the electromagnet assemblies 403, 503, the common normally open contact plates 409, 509 are attached to the electromagnet assemblies 403, 503. No terminals are led out from these common normally open contact plates 409, 509 to the outside of the housing of the electromagnetic relay 300.

A normally closed contact plate 406 is a conductive contact plate with the normally closed contact 43 formed thereon. A normally closed contact plate 506 is a conductive contact plate with the normally closed contact 53 formed thereon.

In this embodiment, normally closed contact terminals 406*t*, 506*t* are integrally formed with these normally closed contact plates 406, 506. These normally closed contact terminals 406*t*, 506*t* are extended through the terminal board 301 from the through-holes 301*e*, 301*f* to the outside.

In this embodiment, the normally closed contact plates 406, 506 are fitted into insertion grooves 411, 511 formed on the electromagnet assemblies 403, 503 and thereby attached to the electromagnet assemblies 403, 503, respectively. When the normally closed contact plate 406 is attached to the electromagnetic assembly 403, the normally closed contact and the normally open contact 44 on the common normally open contact plate 409 are spaced apart from each other with a predetermined gap length. When the normally closed contact plate 506 is attached to the electromagnet assembly 503, the normally closed contact 53 and the normally open contact 54 on the common normally open contact plate 509 are spaced apart from each other with a predetermined gap length. The insertion grooves 411, 511 are formed at a height equal to a distance between the normally open contact 44 and the normally closed contact 43 and at a height equal to a distance between the normally open contact 54 and the normally closed contact 53.

Movable contact springs 407, 408 are both made of a conductive material, and the movable contact 45 is formed on the movable contact spring 407, the movable contact 49 being formed on the movable contact spring 408. In this embodiment, these movable contact springs 407, 408 are fixed by insulators 413, 414 and thereby attached to an armature plate 415 to produce an armature assembly.

Movable contact springs 507, 508 are both made of a conductive material, and the movable contact 55 is formed on the movable contact spring 507, the movable contact 59 being formed on the movable contact spring 508. In this embodiment, these movable contact springs 507, 508 are fixed by insulators 513, 514 and thereby attached to an armature plate 515 to produce an armature assembly.

The movable contact springs 407, 408, 507, 508 are each shaped as substantially L-letter. While the movable contact springs 407, 408 and the movable contact springs 507, 508 are being laid side by side as shown in FIG. 12, the movable contact springs 407, 408 are fixed by insulators 413, 414 at respective sides of the position at which they are bent like L-letter, and the movable contact springs 507, 508 are fixed by insulators 513, 514 at respective sides of the position at which they are bent like L-letter. This fixing process is based on insert molding using an insulating resin as the insulators 413, 414 and 513, 514.

The armature plates 415, 515 made of a magnetic material are fixed to the insulators 414, 514 to produce respective armature assemblies.

These armature assemblies are attached at their portions corresponding to the insulators 413, 513 to the electromagnet assemblies 403, 503. While the coils 41, 51 are not being energized, the movable contacts 45, 55 on the movable contact springs 407, 507 are brought in contact with the normally open contacts 43, 53 and are also spaced apart from the normally open contacts 44, 54 with a predetermined gap length, the movable contacts 49, 59 on the movable contact springs 408, 508 being spaced apart from the normally open contacts 48, 58 with a predetermined gap length.

In the state in which the respective armature assemblies are attached to the electromagnet assemblies 403, 503, the armature plates 415, 515 are attracted by a magnetic attraction from electromagnets created when the coils 41, 51 of the electromagnet assemblies 403, 503 are energized. Since the armature plates 415, 515 are each fixed to the two movable contact springs 407, 408 and 507, 508, the two movable contact springs 407, 408 and 507, 508 are each operated simultaneously in accordance with the movement of the armature plates 415, 515.

The movable contact terminals 407*t*, 408*t*, 507*t*, 508*t* are respectively extended through the terminal board 301 from the through-holes 301*g*, 301*h*, 301*i*, 301*j* to the outside.

With the above arrangement of the electromagnetic relay 300 according to this embodiment, the electromagnetic relay 300 can be operated in the same way as it is operated when the DC motor drive circuit shown in FIG. 10 is driven by the two electromagnetic relays 40, 50.

Figure 13:
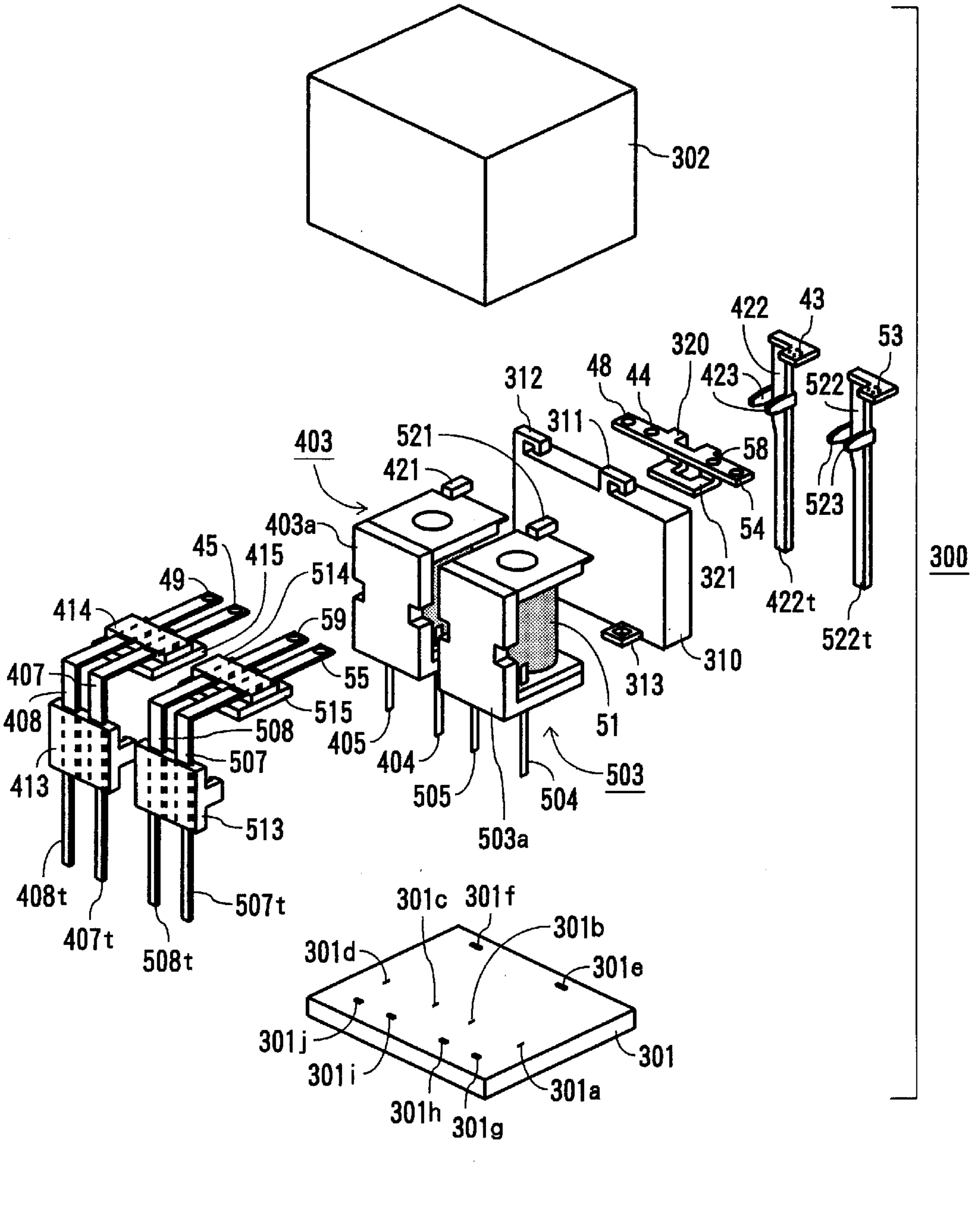
FIG. 13 is an exploded, perspective view showing other example of an electromagnetic relay for use in the DC motor drive circuit shown in FIG. 10.

FIG. 13 is an exploded, perspective view showing other example of one electromagnetic relay 300 in which the functions of the two electromagnetic relays 40, 50 are stored in one housing. The electromagnetic relay 300 in this embodiment differs from the electromagnetic relay 300 shown in FIG. 12 in that the normally open contacts 44, 48, 54, 55 are formed on a common normally open contact plate 320 arranged as a common conductive plate portion and thereby the normally open contacts 44, 48, 54, 58 are electrically connected in common.

In this embodiment, a common attachment plate 310 is used in order to attach the common normally open contact plate 320 to the electromagnet assemblies 403, 503 in common. The common attachment plate 310 includes engagement portions 311, 312. When protruded portions 421, 521 on the electromagnet assemblies 403, 503 are respectively fitted into the engagement portions 311, 312, the common attachment plate 310 is joined to the electromagnet assemblies 403, 503.

Resilient protruded plate portions 313 (only one resilient protruded plate portion 313 is shown) are formed on the common attachment plate 310 at its positions opposing to the corresponding positions on the bottoms of the electromagnet assemblies 403, 503, respectively. When protruded portions (not shown) on the electromagnet assemblies 403, 503 are fitted into concave holes of the resilient protruded plate portions, the common attachment plate 310 can firmly be joined to the electromagnet assemblies 403, 503.

A common normally open contact plate 320 and the normally closed contact plates 422, 522 are attached to the common attachment plate 310. The normally closed contact 43 is formed on the normally closed contact plate 422 and the normally closed contact 53 is formed on the normally closed contact plate 522. Normally closed contact terminals 422*t*, 522*t* are integrally formed with these normally closed contact plates 422, 522. These normally closed contact terminals 422*t*, 522*t* are extended through the terminal board 301 from the through-holes 301*e*, 301*f* to the outside.

Although not shown, on the opposite surface of the electromagnet assemblies 403, 503, the common attachment plate 310 has a concave groove into which the pressure protrusions 423, 523 of the normally closed contact plates 422, 522 are inserted with pressure and concave grooves into which the pressure protrusions 423, 523 of the normally closed contact plates 422, 522 are inserted with pressure.

The movable contact springs 407, 408 and 507, 508 increase their lengths on the side of the movable contacts 45, 49 and 55, 59 by the amount equal to the common attachment plate 310. The positions of the normally closed contacts 422, 522 are deviated in the case of FIG. 12 and hence the positions of the movable contact springs 407, 408 and the positions of the movable contact springs 507, 508 are reversed to those of FIG. 12.

A rest of the electromagnetic relay 300 is similar to that of the electromagnetic relay 300 shown in FIG. 12.

With the arrangement of the electromagnetic relay 300 shown in FIG. 13, similar action and effects can of course be achieved. According to the electromagnetic relay 300 with the arrangement shown in FIG. 13, since the normally open contacts 44, 48, 54, 58 of the four contact groups are formed on the common normally open contact plate 320 arranged as the common conductive plate portion and thereby electrically connected in common, the electromagnetic relay 300 can be simplified in arrangement.

Figure 14:
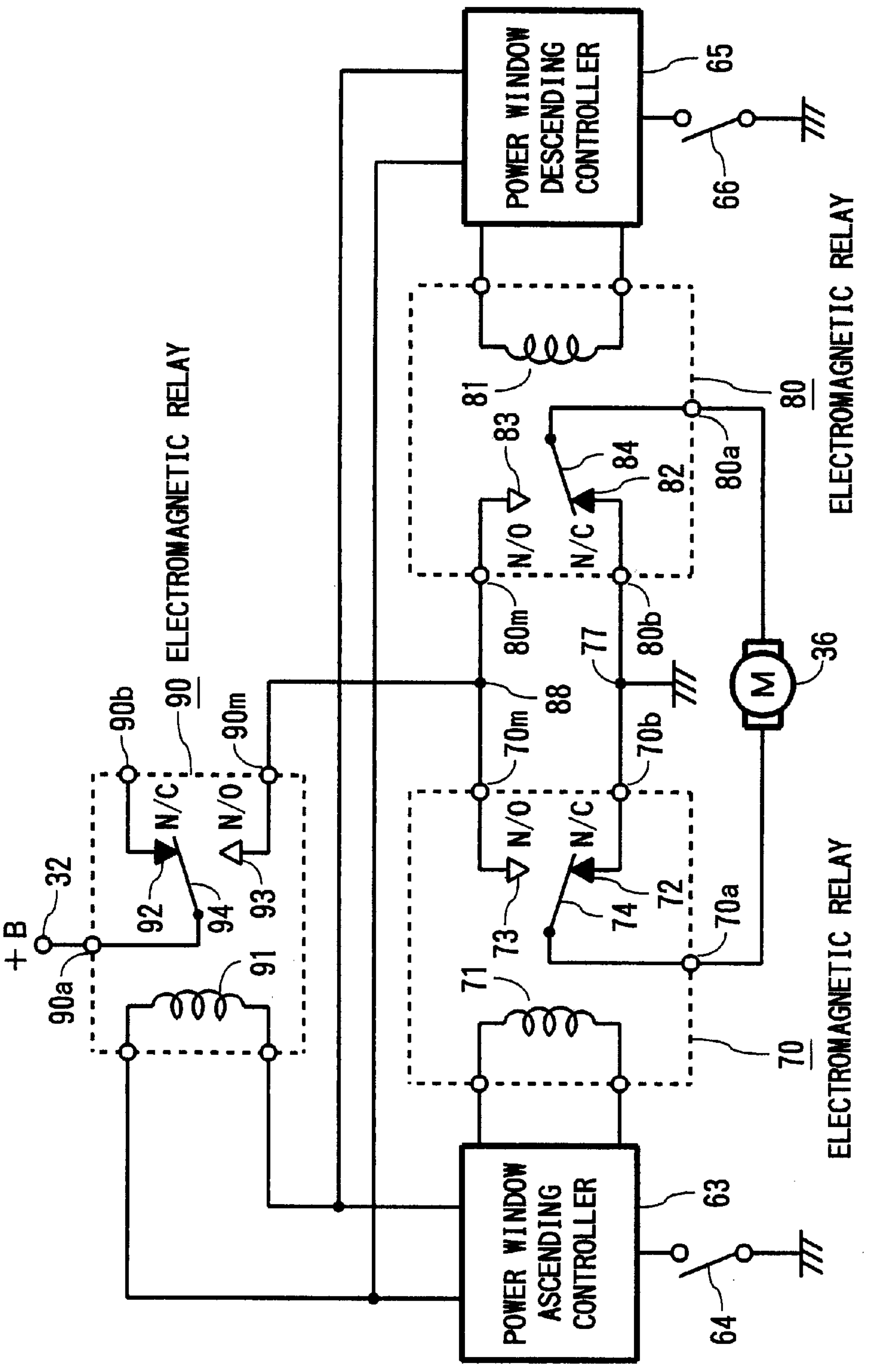
FIG. 14 is a schematic circuit diagram showing a DC motor drive circuit applied to a power window drive section according to a further embodiment of the present invention.

FIG. 14 is a schematic circuit diagram showing a DC motor drive circuit applied to a power window drive section according to a further embodiment of the present invention.

According to the embodiment shown in FIG. 14, one end of the power window DC motor 36 is connected to a movable contact terminal 70*a* led out from a movable contact 74 of an electromagnetic relay 70 used to control the upward movement of the power window. The other end of the DC motor 36 is connected to a movable contact terminal 80*a* led out from a movable contact 84 of an electromagnetic relay 80 used to control the downward movement of the power window.

A normally closed contact terminal 70*b* led out from a normally closed contact 72 of the electromagnetic relay 70 and a normally closed contact terminal 80*b* led out from a normally closed contact 82 of the electromagnetic relay 80 are connected to each other and its connection point 77 is grounded. A normally open contact terminal 70*m* led out from a normally open contact 73 of the electromagnetic relay 70 and a normally open contact terminal 80*m* led out from a normally open contact 83 of the electromagnetic relay 80 are connected to each other and its connection point 83 is connected to a normally open contact terminal 90*m* led out from a normally open contact 93 of an electromagnetic relay used to control both of the upward movement and downward movement of the power window.

A normally closed contact terminal 90*b* led out from a normally closed contact 93 of the electromagnetic relay 90 makes a free end, and a movable contact terminal 90*a* led out from a movable contact 94 of the electromagnetic relay 90 is connected to the power supply at the terminal 32.

Controlling current, obtained when the user is operating the power window drive section to move the power window upward, is supplied from a power window ascending controller 63 to a coil 71 of the electromagnetic relay 70 and a coil 91 of the electromagnetic relay 90. Controlling current, obtained when the user is operating the power window drive section to move the power window downward, is supplied from a power window descending controller 65 to a coil 81 of the electromagnetic relay 80 and the coil 91 of the electromagnetic relay 90.

Figure 15:
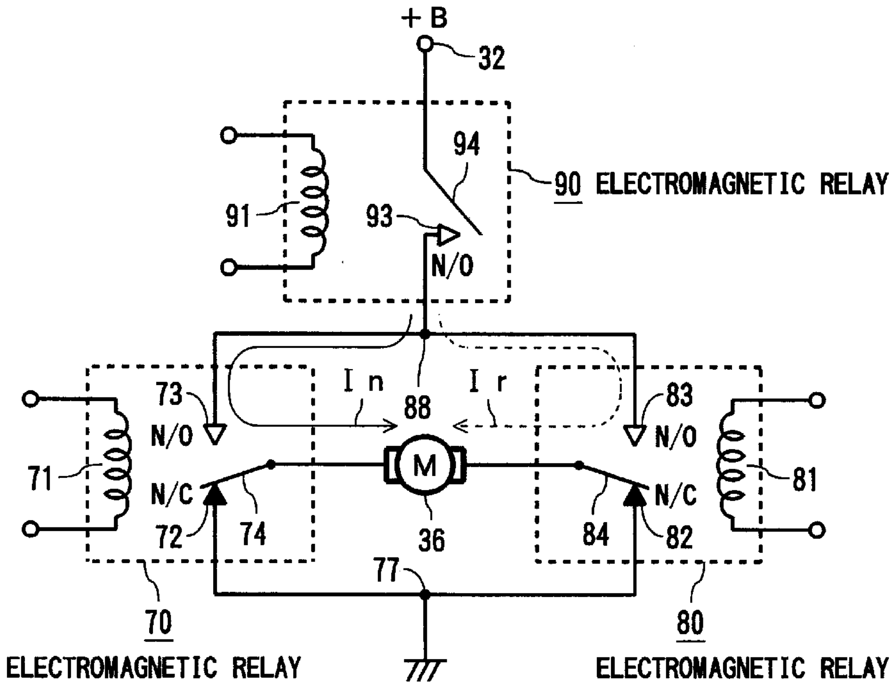
FIG. 15 is a schematic circuit diagram showing a simplified circuit of the embodiment shown in FIG. 14.

FIG. 15 shows the DC motor drive circuit shown in FIG. 14 in the form of a more simplified circuit arrangement. Operation of the DC motor drive circuit shown in FIG. 14 will be described with reference to FIG. 15 as well as FIG. 14.

While the user is operating the power window drive section to move the power window upward, the switch 64 is being energized to permit the power window ascending controller 63 to supply controlling current to the coils 71, 91 of the electromagnetic relays 70, 90 to energize the coils 71, 91 so that the electromagnetic relays 70, 90 connect the movable contacts 74, 94 to the normally open contacts 73, 93 substantially simultaneously in unison with each other. Therefore, direct current In flows through the DC motor 36 in the direction shown by a solid-line arrow In in FIG. 15 and thereby the DC motor 36 is driven in the positive direction to move the power window of automobile upward.

When the user stops operating the power window drive section to move the power window upward, the coils 71, 91 of the electromagnetic relays 70, 90 are not energized by controlling current so that the movable contacts 71, 94 are substantially simultaneously returned to the normally closed contacts 72, 92 in unison with each other. Therefore, the DC motor 36 is braked to stop the upward movement of the power window.

While the user is operating the power window drive section to move the power window downward, the switch 66 is being energized to permit the power window descending controller 65 to supply controlling current to the coils 81, 91 of the electromagnetic relays 80, 90 to energize the coils 81, 91 so that the electromagnetic relays 80, 90 connect the movable contacts 84, 94 to the normally closed contacts 83, 93 substantially simultaneously in unison with each other. Therefore, direct current Ir flows through the DC motor 36 in the direction shown by a dashed-line arrow Ir in FIG. 15 and thereby the DC motor 36 is driven in the opposite direction to move the power window downward.

When the user stops operating the power window drive section to move the power window downward, the switch 66 is turned off and the coils 81, 91 of the electromagnetic relays 80, 90 are not energized by the controlling current so that the movable contacts 84, 94 are substantially simultaneously returned to the normally closed contacts 82, 92 in unison with each other. Therefore, the DC motor 36 is braked to stop the downward movement of the power window.

As will be clear from the above description, also in this embodiment, the normally open contacts 73, 83 of the electromagnetic relay 70 or 80 are connected through the normally open contact of the electromagnetic relay 90 to the power supply at the terminal 32 and hence the two normally open contacts 73, 93 or 83, 93 are connected in series to the passage of the direct current In or Ir which flows through the DC motor 36.

Therefore, similarly to the aforementioned embodiments, even when the contact gap length in each contact group is reduced, the arc cut-off capability can be improved and the problem of the short occurring between the normally open contact N/C and the normally closed contact N/O can be alleviated.

While both end of the DC motor 36 are grounded when the DC motor 36 is braked similarly to the aforementioned embodiments, the present invention is not limited thereto and both ends of the DC motor 36 can be connected to the power supply at the terminal 32 when the DC motor 36 is braked.

Figure 16:
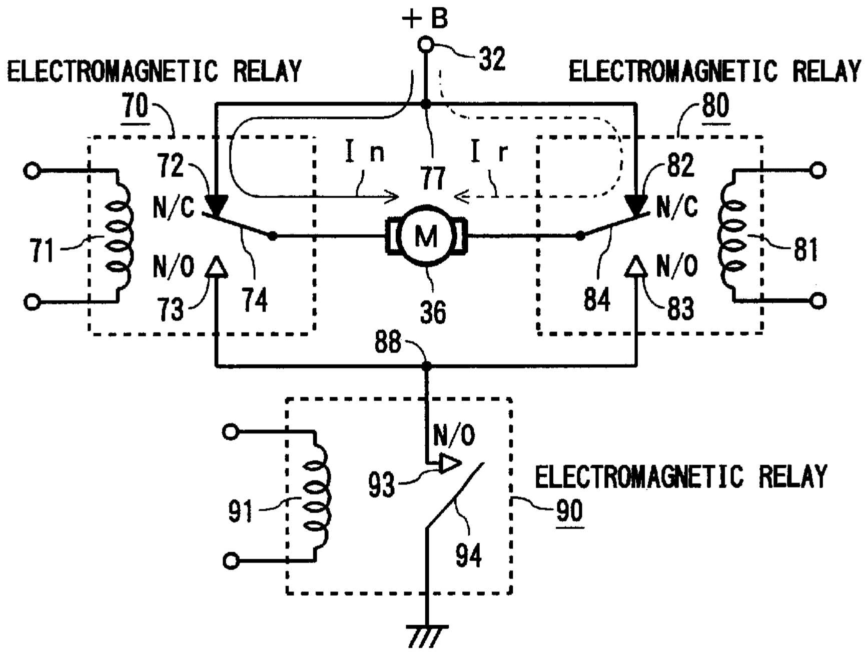
FIG. 16 is a schematic circuit diagram showing a simplified circuit of a modified example of the DC motor drive circuit in the embodiment shown in FIG. 14.

FIG. 16 is a circuit diagram showing such a simplified circuit arrangement attained when both ends of the DC motor 36 are connected to the power supply at the terminal 32 when the DC motor 36 is braked. With the above arrangement of the embodiment shown in FIG. 16, there can be achieved exactly the same action and effects as those of the above embodiment shown in FIG. 14.

According to this embodiment, instead of three electromagnetic relays, it is possible to use one electromagnetic relay including a housing to store therein three coils and a plurality of contact groups respectively controlled by the three coils.

With the above arrangement of one electromagnetic relay, if a plurality of movable contacts are substantially simultaneously switched in unison with each other, then when the respective movable contacts are returned from the normally open contacts N/O to the normally closed contacts N/O, control of timing at which a plurality of movable contacts are connected to the normally closed contact N/C after those movable contacts had been brought in contact with neither the normally open contacts N/O nor the normally closed contacts N/C simultaneously can be facilitated or removed.

Figure 17:
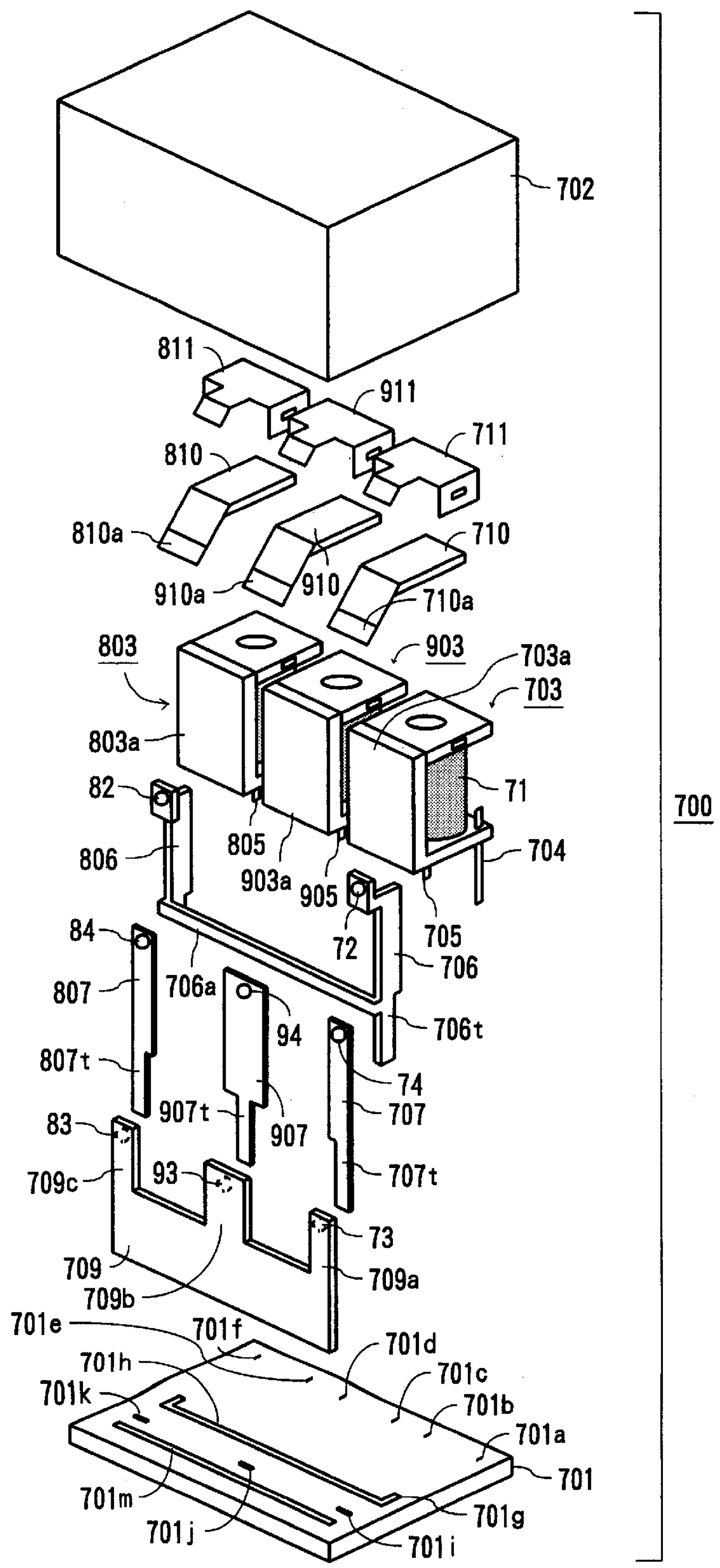
FIG. 17 is an exploded, perspective view showing an example of an electromagnetic relay for use in the DC motor drive circuit shown in FIG. 14.
Figure 18:
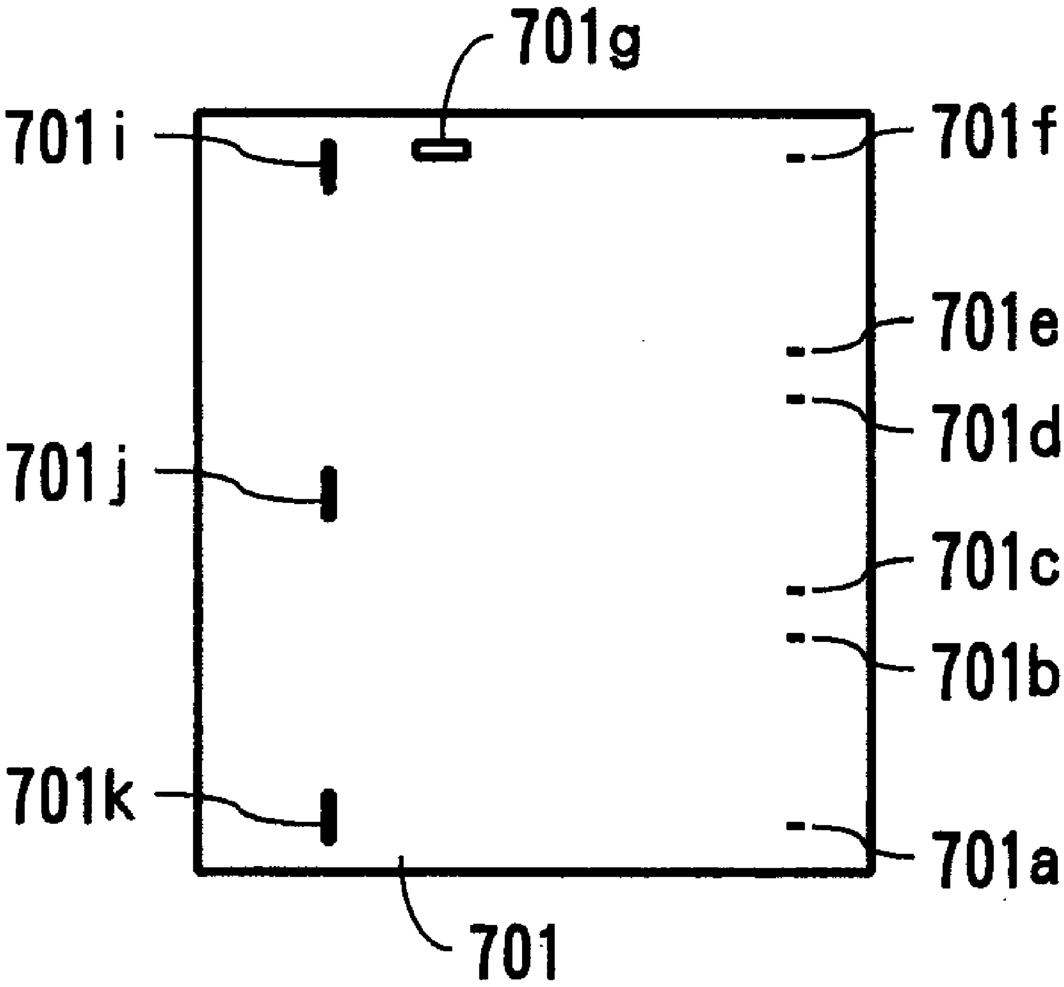
FIG. 18 is a rear view showing a part of the example of the electromagnetic relay for use in the DC motor drive circuit shown in FIG. 14.

FIGS. 17 and 18 show an example of an electromagnetic relay 700 including one housing to store therein three coils and a plurality of contact groups. FIG. 17 is an exploded, perspective view of the electromagnetic relay 700.

Assemblies of the electromagnetic relay 700 shown in FIG. 17 are assembled on a terminal board 701, and assembled parts are enclosed when a cover 702 is joined to the terminal board 701. A housing of the electromagnetic relay 700 is comprised of the terminal board 701 and the cover 702.

FIG. 18 is a rear view of the terminal board 701 and illustrates through-holes 701*a*, 701*b*, 701*c*, 701*d*, 701*e*, 701*f*, 701*g*, 701*i*, 701*j*, 701*k* from which terminals are to be led out to the outside of the housing of the electromagnetic relay 700.

In FIG. 17, parts denoted by reference numerals 700*s* following reference numeral 703 identify those parts corresponding to the electromagnetic relay 70 shown in FIG. 14. Parts denoted by reference numerals 800*s* following reference numeral 803 identify those parts corresponding to the electromagnetic relay 80 shown in FIG. 14. Parts denoted by reference numerals 900 identify those parts corresponding to the electromagnetic relay 90 shown in FIG. 14.

In order to facilitate the understanding of the description, reference numerals of the normally closed contacts and the normally open contacts of the respective contact groups and the coils are made corresponding to those of the electromagnetic relays 70, 80, 90 shown in FIG. 14.

In FIG. 17, there are shown electromagnet assemblies 703, 803, 903. The respective electromagnet assemblies 703, 803, 903 include L-shaped yokes 703*a*, 803*a*, 903*a* to support coils 71, 81, 91 with iron-cores.

The electromagnet assemblies 703, 803, 903 include conductive coil terminals 704, 705, 804, 805, 904, 905 with one end and the other end of the coils 71, 81 connected thereto. These coil terminals 704, 705, 804, 805, 904, 905 are extended through the terminal board 701 from the through-holes 701*a*, 701*b*, 701*e*, 701*f*, 701*c*, 701*d* to the outside.

The electromagnetic relay 700 according to this embodiment includes the normally closed contact 72 of the electromagnetic relay 70 and the normally closed contact 82 of the electromagnetic relay 80 but does not include the normally closed contact 92 of the electromagnetic relay 90 because it is not necessary.

A normally closed contact plate 706 is a conductive contact plate with the normally closed contact 72 formed thereon. A normally closed contact plate 806 is a conductive contact plate with the normally closed contact 82 formed thereon. In this example, these normally closed contact plates 706, 806 are joined as an integrated contact plate and are also connected electrically. A normally closed contact terminal 706*t* is integrally formed with the above integrated contact plate of the normally closed contacts plates 706, 806, and the normally closed contact terminal 706*t* corresponds to the connection point 77 shown in FIG. 14.

The normally closed contact terminal 796*t* is extended through the terminal board 701 from the through-hole 701*g* to the outside. A joint portion of the normally closed contact plates 706, 806 us fitted into a concave groove 701*h* on the terminal board 701.

A movable contact spring 707 is a conductive movable contact spring with the movable contact 74 formed thereon. A movable contact terminal 707*t* is integrally formed with the movable contact spring 707, and the movable contact terminal 707*t* is extended through the terminal board 701 from the through-hole 701*i* to the outside.

A movable contact spring 808 is a conductive movable contact spring with the movable contact 84 formed thereon. A movable contact terminal 807*t* is integrally formed with the movable contact spring 807, and the movable contact spring 807$t$ is extended through the terminal board 701 from the through-hole 701$k$ to the outside.

A movable contact spring 907 is a conductive movable contact spring with the movable contact 94 formed thereon. A movable contact terminal 907$t$ is integrally formed with the movable contact spring 907, and the movable contact terminal 907$t$ is extended through the terminal board 701 from the through-hole 701$j$ to the outside.

A common normally open contact plate is made of a conductive material and the normally open contacts 73, 83, 93 are formed on the common normally open contact plate 709 in common.

Specifically, the normally open contacts 73, 83, 93 of the three relay sections corresponding to the three electromagnetic relays 70, 80, 90 in FIG. 14 are formed on the common normally open contact plate 709 arranged as a common conductive plate portion and thereby electrically connected to each other in common.

The common normally open contact plate 709 is fitted into a concave groove 701$m$ on the terminal board 701. However, no terminal is led out from the common normally open contact plate 709 to the outside of the housing of the electromagnetic relay 700.

An armature 710 made of a magnetic material is attached to the electromagnet assembly 703 by a hinge spring 711. When the armature 710 is attracted toward the electromagnet assembly 703 by a magnetic attraction from an electromagnet created when the coil 71 is energized by current, an armature card-like portion 710$a$ disposed at the tip of the armature 710 displaces the movable contact spring 707 toward the common normally open contact plate 709 side.

An armature 810 made of a magnetic material is attached to the electromagnet assembly 803 by a hinge spring 811. When the armature 810 is attracted toward the electromagnet assembly 803 by a magnetic attraction from an electromagnet created when the coil 81 is energized by current, an armature card-like portion 810$a$ disposed at the tip of the armature 810 displaces the movable contact spring 807 toward the common normally open contact plate 709.

An armature 910 made of a magnetic material is attached to the electromagnet assembly 903 by a hinge spring 911. When the armature 910 is attracted toward the electromagnet assembly 903 by a magnetic attraction from an electromagnet created when the coil 91 is energized by current, an armature card-like portion 910$a$ disposed at the tip of the armature 910 displaces the movable contact spring 907 toward the common normally open contact plate 709.

With the above arrangement of the electromagnetic relay 700, in the state in which any one of the coils 71, 81, 91 of the electromagnet assemblies 703, 803, 903 is not energized by current, the armatures 710, 910, 710 are not driven by electromagnets so that the movable contact springs 707, 907, 807 are not displaced toward the common normally open contact plate 709. Therefore, the movable contact 74 is connected to the normally closed contact 72, the movable contact 84 is connected to the normally closed contact 82 and the movable contact 94 is separated from the normally open contact 93.

As already shown in FIG. 14, while the user is operating the power window drive section to move the power window upward, the coils 71, 91 are energized by the controlling current from the power window ascending controller 63 and the armatures 710, 910 are attracted toward the electromagnet assemblies 703, 903. As a result, the armature card-like portions 710$a$, 910$a$ of the armatures 710, 910 resiliently displace the movable contact springs 707, 907 toward the common normally open contact plate 709 to connect the movable contact 74 to the normally open contact 73 and to connect the movable contact 94 to the normally open contact 93.

Therefore, the two normally open contacts 73, 93 are connected in series between the movable contact terminal 707$t$ of the movable contact spring 707 and the movable contact terminal 907$t$ of the movable contact spring 907.

When the supply of the controlling current to the coils 71 and 91 is stopped, since the resilient displacement force exerted upon the movable contact springs 707, 907 from the armatures 710, 910 is withdrawn. Hence, the electromagnetic relay 700 is released to allow the movable contact springs 707, 907 to separate from the normally open contacts 73, 93 of the common normally open contact plate 708 by their own spring force substantially simultaneously and to allow the movable contact 74 to be connected to the normally closed contact 72.

As already shown in FIG. 14, while the user is operating the power window drive section to move the power window downward, the power window descending controller 65 supplies the controlling current to the coils 81, 91 to energize the coils 81, 91 to attract the armatures 810, 910 toward the electromagnet assemblies 803, 903. As a result, the armature card-like portions 810$a$, 910$a$ of the armatures 810, 910 resiliently displace the movable contact springs 807, 907 toward the common normally open contact plate 709 to connect the movable contact 84 to the normally open contact 83 and to connect the movable contact 94 to the normally open contact 93.

Therefore, the two normally open contacts 83, 94 are connected in series between the movable contact terminal 807$t$ of the movable contact spring 807 and the movable contact terminal 907$t$ of the movable contact spring 907.

When the supply of the controlling current to the coils 81, 91 is stopped, the resilient displacement force exerted upon the movable contact springs 807, 907 from the armatures 810, 910 is withdrawn. Hence, the electromagnetic relay 700 is released to allow the movable contact springs 807, 907 to separate from the normally open contacts 83, 93 of the common normally open contact plate 709 by their own spring force substantially simultaneously and to allow the movable contact 84 to be connected to the normally closed contact 82.

The DC motor drive circuit using the electromagnetic relay 700 thus arranged as the DC motor drive circuit shown in FIG. 14 can achieve similar action and effects. Specifically, according to this embodiment, it is possible to realize the DC motor drive circuit used to move the power window upward or downward in which the arc cut-off capability is excellent by using one electromagnetic relay whose contact gap length is reduced.

In the case of the electromagnetic relay 700 according to the embodiment shown in FIGS. 17 and 18, since the three normally open contacts 73, 83, 93 are integrally formed on the common normally open contact plate 709, the assemblies can decrease and the structure can be made simple. In addition, an electrical connection process for connecting a plurality of normally open contacts in series can be removed.

In the embodiment of the electromagnetic relay 700 shown in FIG. 7, since the normally closed contacts 72, 83 are connected to each other within the housing as the common normally closed contact assembly for use with the DC motor drive circuit shown in FIG. 14 and the terminal 706$t$ corresponding to the connection point 77 is led out from this common normally closed contact assembly, the terminals can decrease and the assemblies can decrease.

Figure 19:
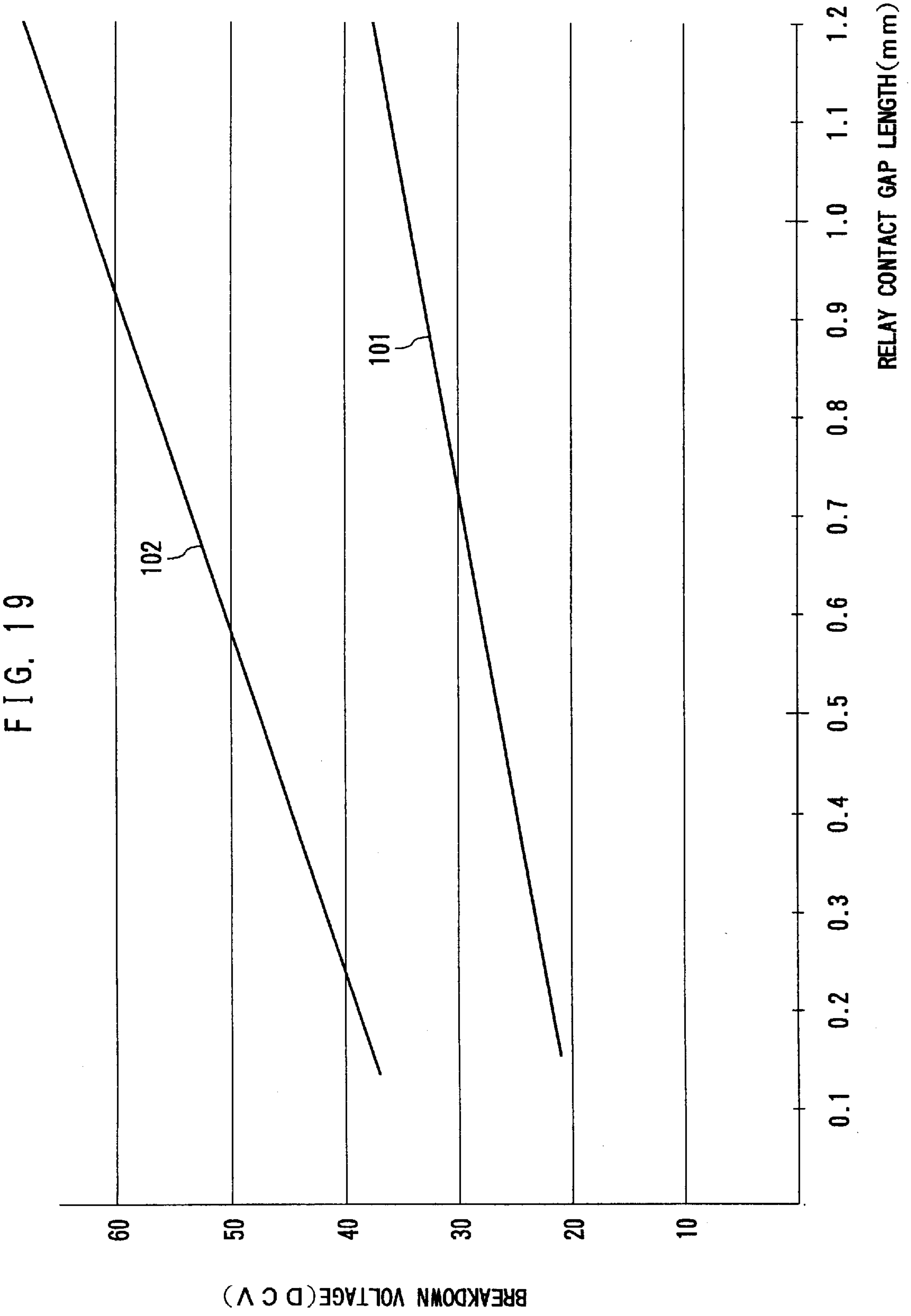
FIG. 19 is a diagram showing characteristic curves to which reference will be made in explaining the effects achieved by the DC motor drive circuit according to the embodiments of the present invention in comparison with those achieved by the prior-art DC motor drive circuit.

FIG. 19 is a diagram showing characteristic curves to which reference will be made in explaining a relationship between a voltage (referred to as a "breakdown voltage") at which the electromagnetic relay is broken by a short-circuit between the normally closed contact N/O and the normally open contact N/C due to an arc occurring when the normally open contact N/C separates from the movable contact and the contact gap length.

Figure 1:
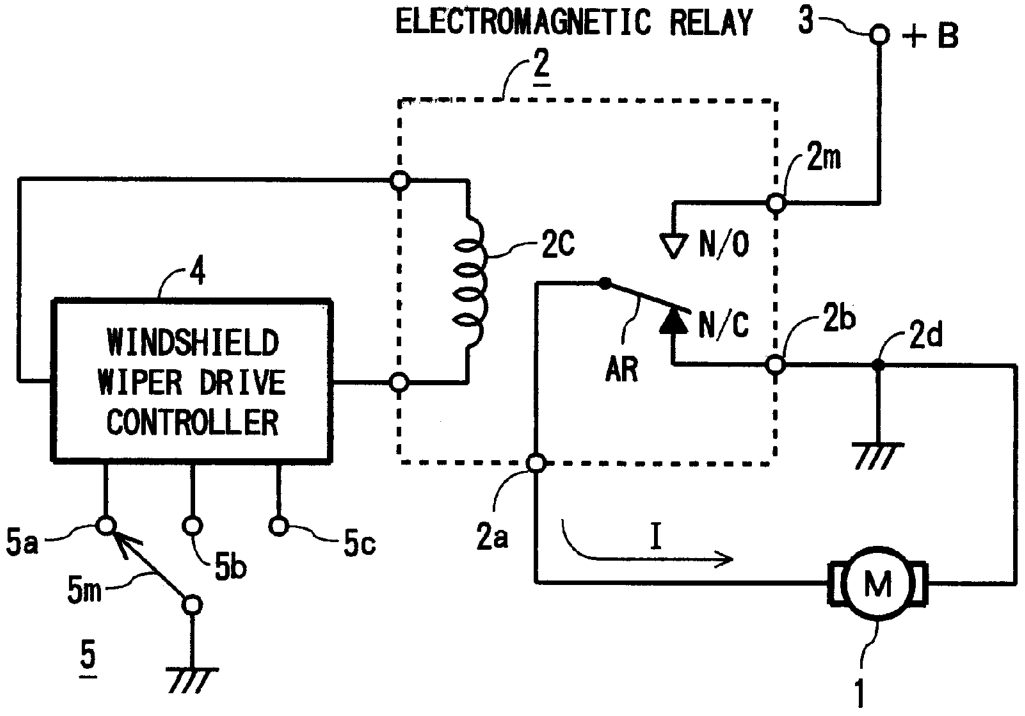
FIG. 1 (PRIOR ART)
FIG. 1 is a schematic circuit diagram showing an example of a conventional DC motor drive circuit for use in a windshield wiper drive section of automobile.

A solid-line curve 101 in FIG. 19 shows results obtained when the breakdown voltage and the contact gap length of the conventional electromagnetic relay shown in FIG. 1 or 2 were measured. A study of the solid-line characteristic curve 101 reveals that the electromagnetic relay for 12V having the contact gap length of 0.3 mm cannot be used for the electromagnetic relay using the DC voltage of 24V but instead, an electromagnetic relay having a long contact gap length should be used as mentioned before.

A solid-line characteristic curve 102 in FIG. 19 shows results obtained when the breakdown voltage and the contact gap length of the electromagnetic relay for use with the DC motor drive circuit according to the above embodiments were measured wherein the two normally open contacts are connected in series to the passage of the direct current for driving the DC motor. As is clear from this solid-line characteristic curve 102, it was experimentally confirmed that, even when the battery voltage increases to a voltage as high as 42V, the electromagnetic relay is not broken by the dead short caused between the normally open contact and the normally closed contact due to the arc.

While the two normally open contacts are connected in series by using the electromagnetic relay including two contact groups in the above embodiments shown in FIGS. 3, 8, 10 and 14, the present invention is not limited thereto. If more than two normally open contacts of the contact groups are connected in series to the passage of the direct current flowing through the DC motor by using the electromagnetic relay including more than two contact groups, the present invention can cope with the case in which a voltage at the direct current power supply increases much more.

While the respective contact terminals are led out from the respective contact groups and the contact terminals are electrically connected to each other in the outside of the electromagnetic relay as described above, the present invention is not limited thereto, and an electromagnetic relay in which two normally open contacts are previously connected in series within a housing can be prepared and used as the aforementioned automobile parts, Further, while the electromagnetic relay including a plurality of contact groups is used as described above, the present invention is not limited thereto, and electromagnetic relays comprising respective contact groups may be different electromagnetic relays.

Furthermore, the present invention is not limited to the windshield wiper drive section and the power window drive section of automobile in the above embodiments and can be applied to all DC motor drive circuits for driving and controlling a DC motor in the above manner by using an electromagnetic relay.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A direct current motor drive circuit comprising:

a contact group operated under control of electromagnet created when a coil is energized by current supplied thereto;

direct current motor of which one end is connected to one end of direct current power supply and a normally closed contact of said contact group and whose other end is connected to a movable contact of said contact group; and one or a plurality of other normally open contacts connected between one normally open contact of said contact group and the other end of said direct current power supply and openable or closable in unison with said one normally open contact.

2. A direct current motor drive circuit according to claim 1, wherein said one or said plurality of other normally open contacts are contained in said contact group operated under control of electromagnet created when said coil is energized by current supplied thereto.

3. A direct current motor drive circuit according to claim 1, wherein said one or said plurality of other normally open contacts make another contact group different from said contact group and said coil energized to operate said contact group under control of electromagnet and a coil energized to operate said another contact group under control of electromagnet are controlled in unison with each other.

4. A direct current motor drive circuit according to claim 1, wherein said direct current motor drive circuit is for use as a circuit for driving a windshield wiper.

5. A direct current motor drive circuit comprising:

a first contact group operated under control of electromagnet created when a first coil is energized by current supplied thereto and whose normally closed contact is connected to one end of direct current power supply;

a second contact group operated under control of electromagnet created when a second coil different from said first coil is energized by current supplied thereto and whose normally closed contact is connected to one end of direct current power supply;

direct current motor of which one end is connected to a movable contact of said first contact group and whose other end is connected to a movable contact of said second contact group;

one or a plurality of first other normally open contacts connected between one normally open contact of said first contact group and the other end of said direct current source and openable or closable in unison with said one normally open contact; and one or a plurality of second other normally open contacts connected between one normally open contact of said second contact group and the other end of said direct current power supply and openable or closable in unison with said one normally open contact.

6. A direct current motor drive circuit according to claim 5, wherein said one or said plurality of first other normally open contacts are contained in said first contact group operated under control of electromagnet created when said first coil is energized by current supplied thereto and said one or said plurality of second other normally open contacts are contained in said second contact group operated under control of electromagnet created when said second coil is energized by current supplied thereto.

7. A direct current motor drive circuit according to claim 5, wherein said one or said plurality of first other normally open contacts make a third contact group different from said first contact group operated under control of electromagnet created when said first coil is energized by current supplied thereto, said one or said plurality of second other normally open contacts make a fourth contact group different from said second contact group operated under control of electromagnet created when said second coil is energized by current supplied thereto, said first coil and a coil energized to operate said third contact group under control of electromagnet are controlled in unison with each other and said second coil and a coil energized to operate said fourth contact group under control of electromagnet are controlled in unison with each other.

8. A direct current motor drive circuit according to claim 5, further comprising control sections for independently controlling the supply of current to said first and second coils so that said direct current motor is rotated in the positive direction or in the opposite direction.

9. A direct current motor drive circuit according to claim 5, wherein said direct current motor drive circuit is for use as a circuit for moving a power window upward and a circuit for moving a power window downward.

10. A direct current motor drive circuit comprising:

a first contact group operated under control of electromagnet created when a first coil is energized by current supplied thereto and whose normally closed contact is connected to one end of direct current power supply;

a second contact group operated under control of electromagnet created when a second coil different from said first coil is energized by current supplied thereto, a normally closed contact thereof being connected to one end said direct current power supply and a normally open contact thereof being connect to a normally open contact of said first contact group; and one or a plurality of other normally open contacts connected between a connection point between said normally open contact of said first contact group and said normally open contact of said second contact group and the other end of said direct current power supply and openable or closable in unison with said normally open contact of said first contact group and said normally open contact of said second contact group.

11. A direct current motor drive circuit according to claim 10, wherein said direct current motor drive circuit is for use as a circuit for moving a power window upward and a circuit for moving a power window downward.

12. A direct motor drive circuit comprising:

an electromagnet relay including at least one coil and a contact group containing a plurality of normally open contacts which are connected in series under control of electromagnet created when said coil is energized;

a control section for supply controlling current to said coil of said electromagnetic relay; and direct current motor driven by direct current supplied thereto through said plurality of normally open contacts connected in series in said electromagnetic relay when said coil of said electromagnetic relay is energized by controlling current supplied thereto from said control section, the rotation of said direct current motor being braked across one end and other end connected by said electromagnetic relay when said electromagnetic relay is connected to a normally closed contact after said control section has stopped supplying said controlling current to said coil.

13. A direct current motor drive circuit according to claim 12, wherein said control section is a windshield wiper controller.

14. A direct current motor drive circuit according to claim 12, wherein said control section is a power window ascending controller or a power window descending controller.

* * * * *

UNITED STATES PATENT AND TRADEMARK OFFICE

CERTIFICATE OF CORRECTION

PATENT NO. : 6,404,155 B1
DATED : June 11, 2002
INVENTOR(S) : Hideo Funayama et al.

It is certified that error appears in the above-identified patent and that said Letters Patent is hereby corrected as shown below:

Title page,
Please add the following:

-- [30] Foreign Application Priority Data:

| | | |
|---|---|---|
| November 12, 1999 | (JP) | 322434/1999 |
| November 12, 1999 | (JP) | 322435/1999 |
| September 8, 2000 | (JP) | 272907/2000 |
| September 8, 2000 | (JP) | 272908/2000 -- |

Signed and Sealed this

Twenty-ninth Day of October, 2002

*Attest:*

JAMES E. ROGAN

*Attesting Officer*

*Director of the United States Patent and Trademark Office*